United States Patent
Nakajima et al.

(10) Patent No.: US 8,285,424 B2
(45) Date of Patent: Oct. 9, 2012

(54) VEHICLE-RUNNING-STATE DISPLAY METHOD

(75) Inventors: Kazunari Nakajima, Kobe (JP); Tetsuya Uetani, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 1118 days.

(21) Appl. No.: 12/155,075

(22) Filed: May 29, 2008

(65) Prior Publication Data

US 2008/0300731 A1 Dec. 4, 2008

(30) Foreign Application Priority Data

May 31, 2007 (JP) ................................ 2007-145872

(51) Int. Cl.
*G05D 1/00* (2006.01)
*H04N 7/18* (2006.01)
(52) U.S. Cl. .......................................... 701/1; 348/148
(58) Field of Classification Search ........................ None
See application file for complete search history.

(56) References Cited

U.S. PATENT DOCUMENTS

| | | | |
|---|---|---|---|
| 2003/0195676 A1* | 10/2003 | Kelly et al. ..................... | 701/29 |
| 2007/0225882 A1* | 9/2007 | Yamaguchi et al. ............ | 701/36 |
| 2008/0166023 A1* | 7/2008 | Wang ............................ | 382/107 |
| 2009/0066539 A1* | 3/2009 | Uemura et al. ................ | 340/905 |
| 2009/0080697 A1* | 3/2009 | Kishikawa et al. ............. | 382/103 |
| 2010/0086174 A1* | 4/2010 | Kmiecik et al. ............... | 382/103 |
| 2010/0208070 A2* | 8/2010 | Haynes et al. ................. | 348/148 |

FOREIGN PATENT DOCUMENTS

| | | |
|---|---|---|
| JP | A-63-016785 | 1/1988 |
| JP | A-5-119699 | 5/1993 |
| JP | A-06-186061 | 7/1994 |
| JP | A-06-237463 | 8/1994 |
| JP | A-06-331391 | 12/1994 |
| JP | A-7-318360 | 12/1995 |
| JP | A-8-304086 | 11/1996 |
| JP | A-11-268615 | 10/1999 |
| JP | A-2000-43764 | 2/2000 |
| JP | A-2001-289110 | 10/2001 |
| JP | A-2004-038489 | 2/2004 |
| JP | A-2004-152158 | 5/2004 |
| JP | A-2006-344001 | 12/2006 |

OTHER PUBLICATIONS

Notice of Rejection dated Jul. 3, 2012 from Japanese Patent Application No. 2010-064889 (with partial English-language translation).

* cited by examiner

*Primary Examiner* — Thomas Tarcza
*Assistant Examiner* — Nagi Murshed
(74) *Attorney, Agent, or Firm* — Oliff & Berridge, PLC

(57) ABSTRACT

The present invention has an object of providing a vehicle-running-state display method capable of easily displaying a running state of a vehicle. The invention provides a vehicle-running-state display method, including the steps of obtaining position information, time information, speed information, and acceleration information of a vehicle, detecting a special state of the vehicle, based on the position information, the time information, the speed information, or the acceleration information, displaying a track of the vehicle on a map screen, based on the position information and the time information, and displaying the detected special state of the vehicle, on the map screen on which the track is displayed.

4 Claims, 32 Drawing Sheets

FRONT OF VEHICLE

Fig.21

| | LOWER-LIMIT VALUE | | UPPER-LIMIT VALUE |
|---|---|---|---|
| "SPEED EXCESS" | 10 SEC. | ↑ | 300 SEC. |
| "RAPID ACCELERATION" | 0 TIME | ↑ | 10 TIMES |
| "RAPID DECELERATION" | 0 TIME | ↑ | 10 TIMES |
| "SHARP TURN" | 0 TIME | ↑ | 10 TIMES |
| "IDLING" | 5 MIN. | ↑ | 1 HOUR |
| "LONG-TIME DRIVING" | 0 MIN. | ↑ | 2 HOURS |

(UNIT DISTANCE 100km)

Fig.22

| ORDER | DRIVER NAME 212 | COMPREHENSIVE EVALUATION | | NUMBER OF TIMES OF INFRINGEMENT | ECONOMIC OPERATION RATE | RUNNING DISTANCE | WORKING TIME | MAXIMUM SPEED (GENERAL ROAD) | MAXIMUM SPEED (HIGHWAY) | AVERAGE SPEED | TOTAL RUNNING DISTANCE | TOTAL WORKING TIME 211 | OPERATION TENDENCY |
|---|---|---|---|---|---|---|---|---|---|---|---|---|---|
| | | | RANK | | | | | | | | | | |
| 1 | | 99 | A | 3 TIMES | 72.5% | 417.5km | 05:01 | 120km | 80km | 65km/h | 417.5km | 06:01 | "IDLING" |
| 2 | | 99 | A | 6 TIMES | 84.2% | 905.6km | 09:24 | 110km | 60km | 55km/h | 905.6km | 09:24 | "IDLING" |
| 3 | | 90 | A | 178 TIMES | 67.7% | 4377.8km | 73:57 | 130km | 75km | 60km/h | 4377.8km | 73:57 | "IDLING" |
| 4 | | · | · | · | · | · | · | · | · | · | · | · | · |
| 5 | | · | · | · | · | · | · | · | · | · | · | · | · |
| 6 | | · | · | · | · | · | · | · | · | · | · | · | · |
| 7 | | | | | | | | | | | | | |

◉ RANKING ASSIGNMENT
■ PERIOD ASSIGNMENT
○ EXTRACT BASED ON "ASSIGNED DATE"
◉ EXTRACT BASED ON "ASSIGNED PERIOD"
○ EXTRACT BASED ON "MONTH"
○ EXTRACT BASED ON "OPERATION DAY"
■ DATE
NOV. 17, 2006 ▼ — NOV. 30, 2006 ▼
☐ SELECT DATE
SEARCH

"SPEED EXCESS" / LOWER-LIMIT VALUE 10 SEC. / UPPER-LIMIT VALUE 300 SEC.
"RAPID ACCELERATION" → 0 TIME / 10 TIMES
"RAPID DECELERATION" → 0 TIME / 10 TIMES
"SHARP TURN" → 0 TIME / 10 TIMES
"IDLING" → 5 MIN. / 1 HOUR
"LONG-TIME DRIVING" → 0 MIN. / 2 HOURS
(UNIT DISTANCE 100km)

210

CLOSE

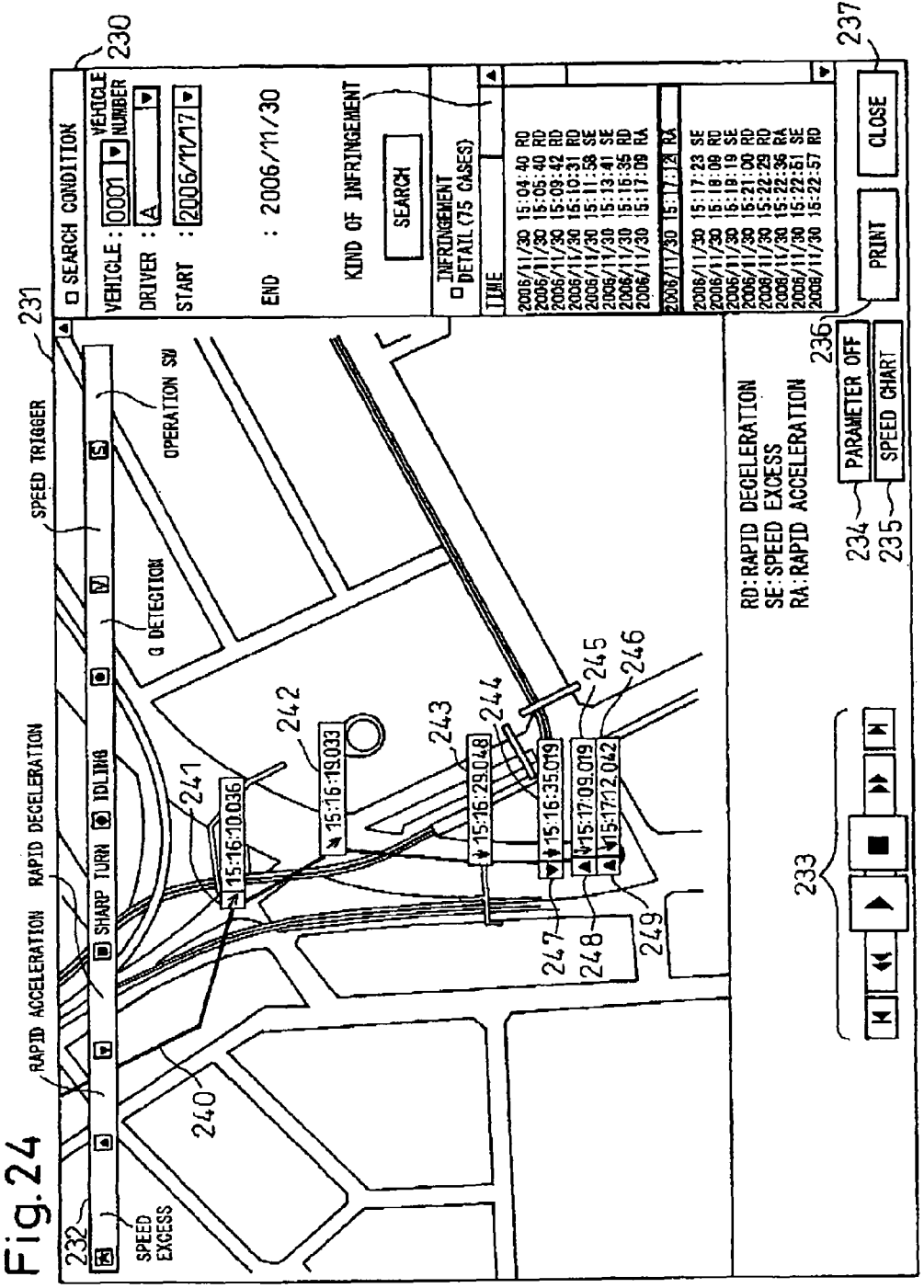

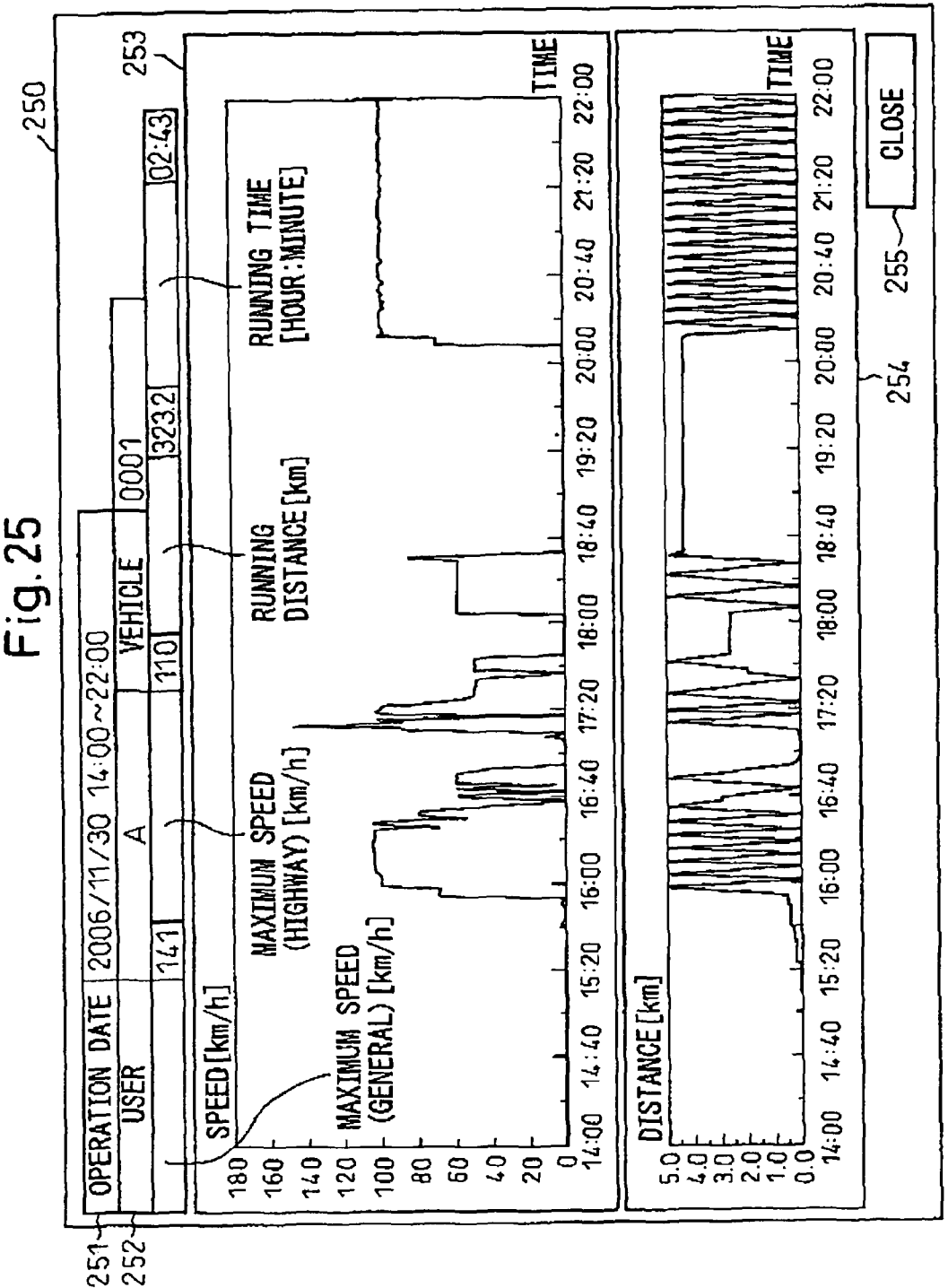

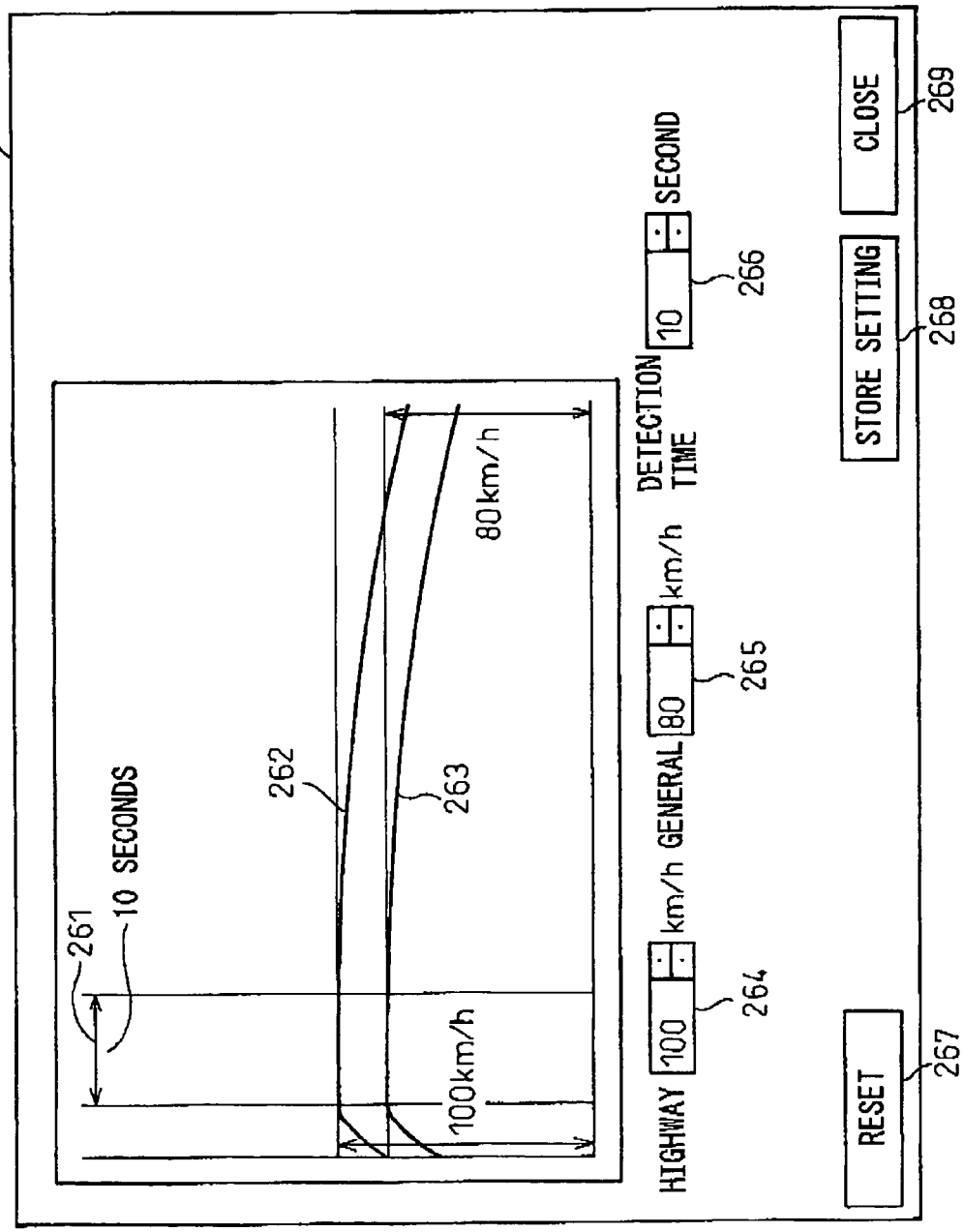

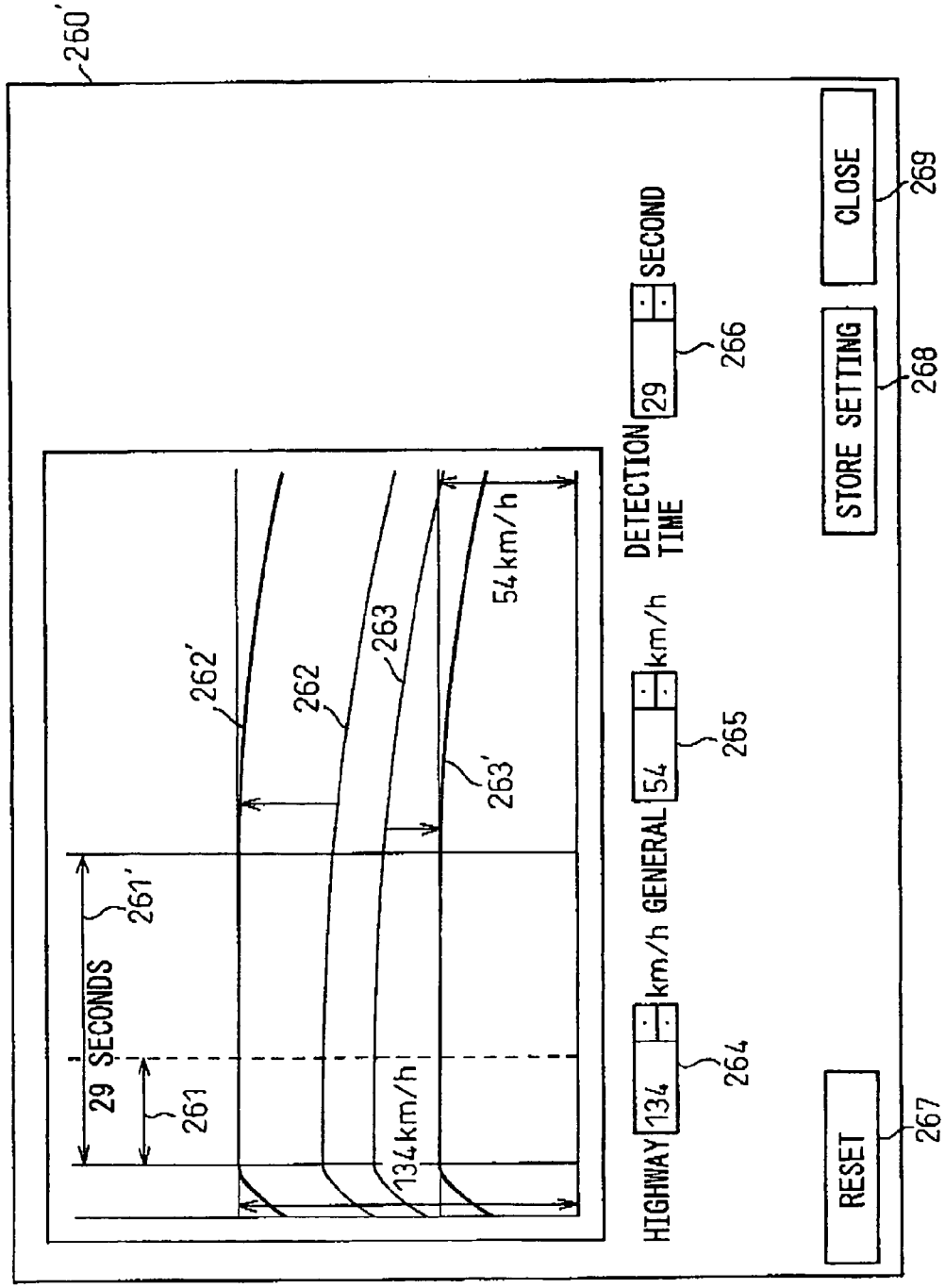

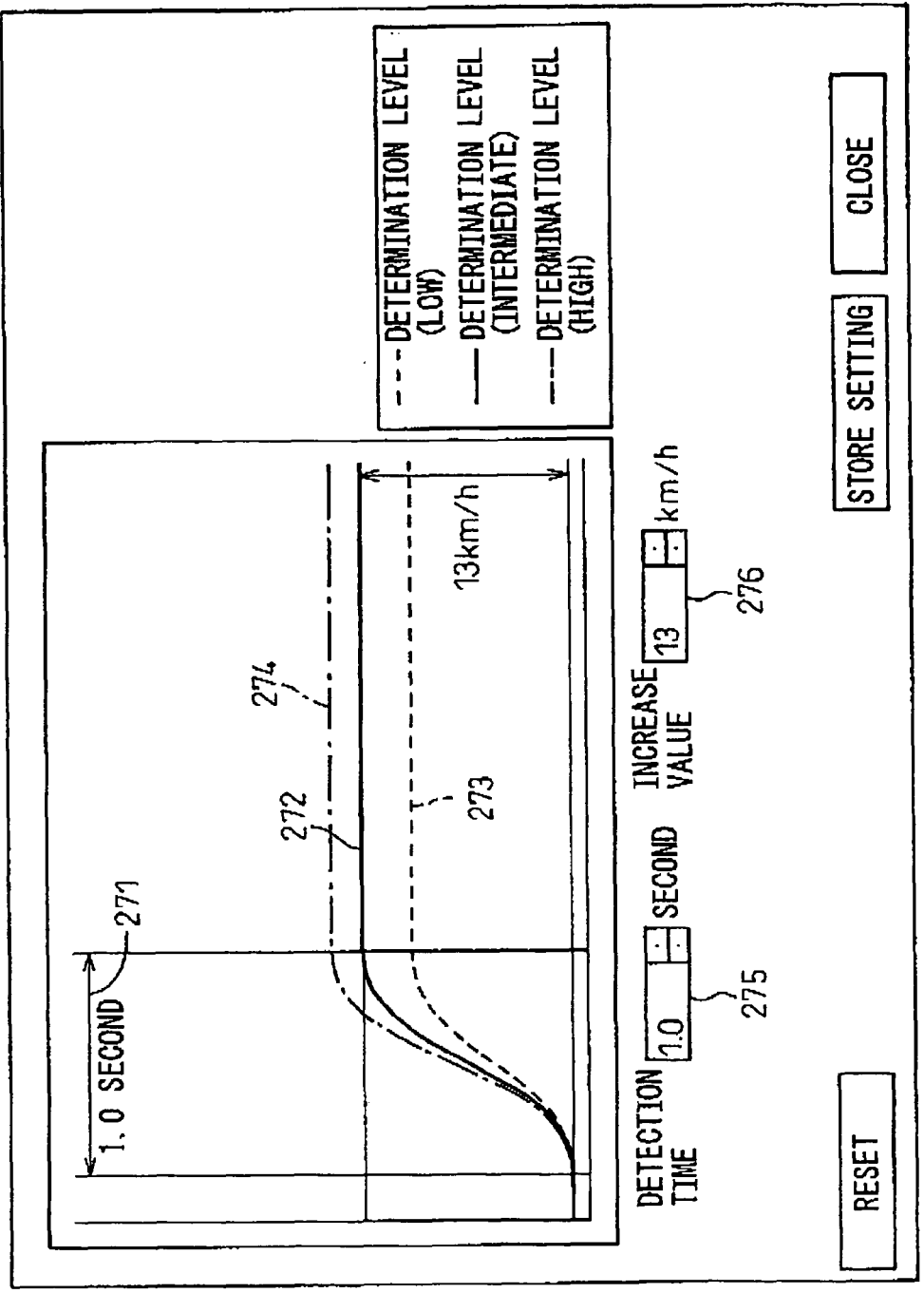

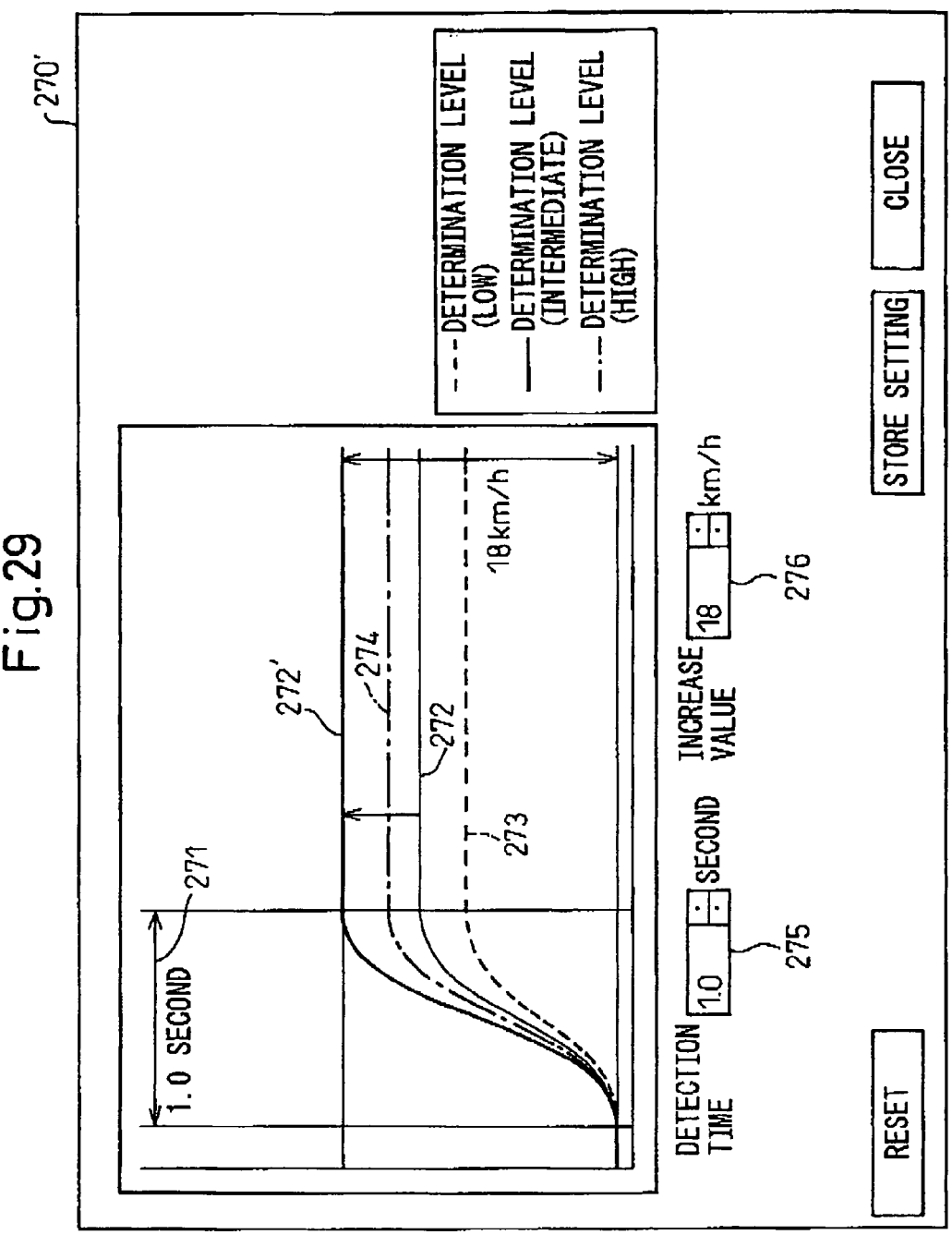

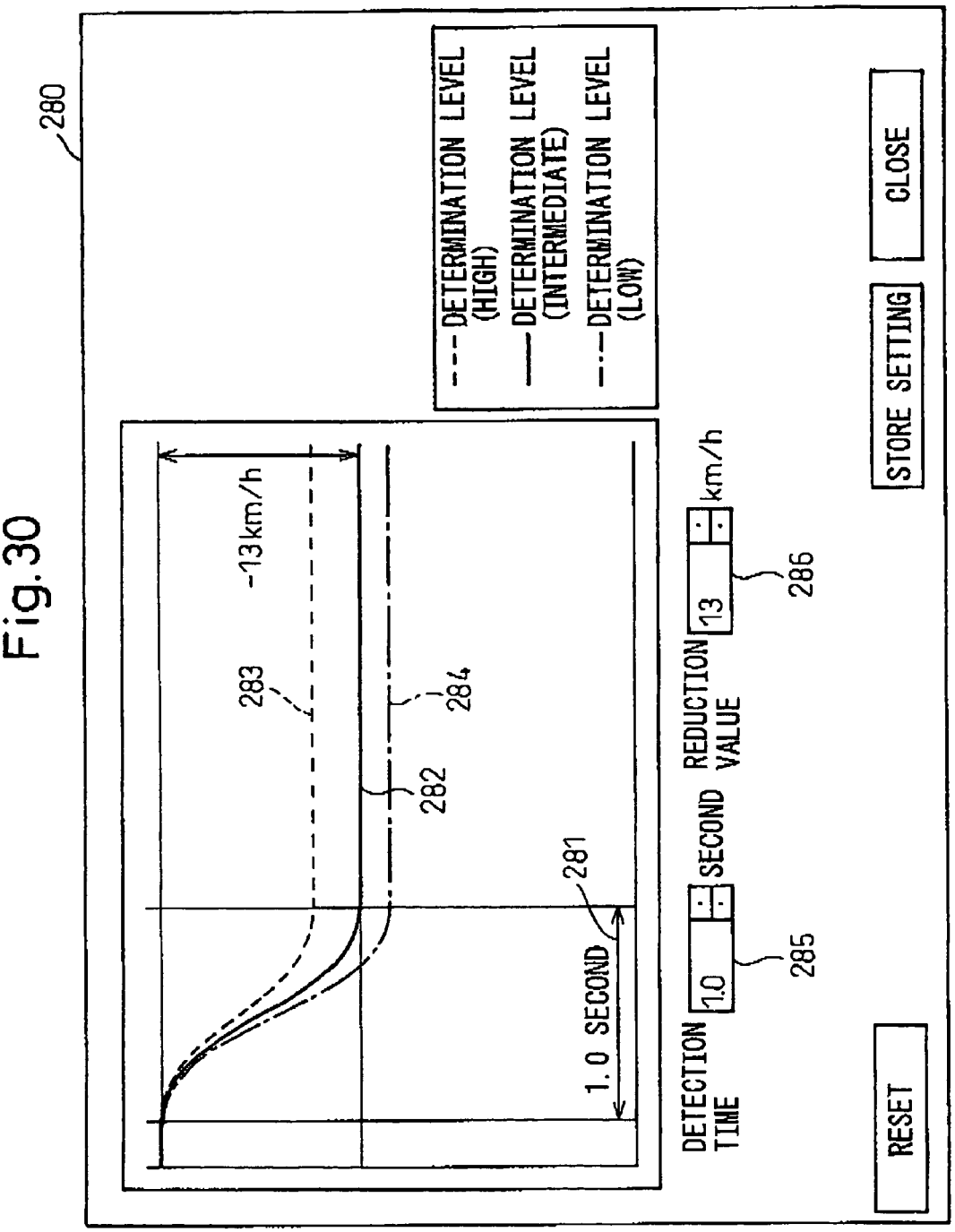

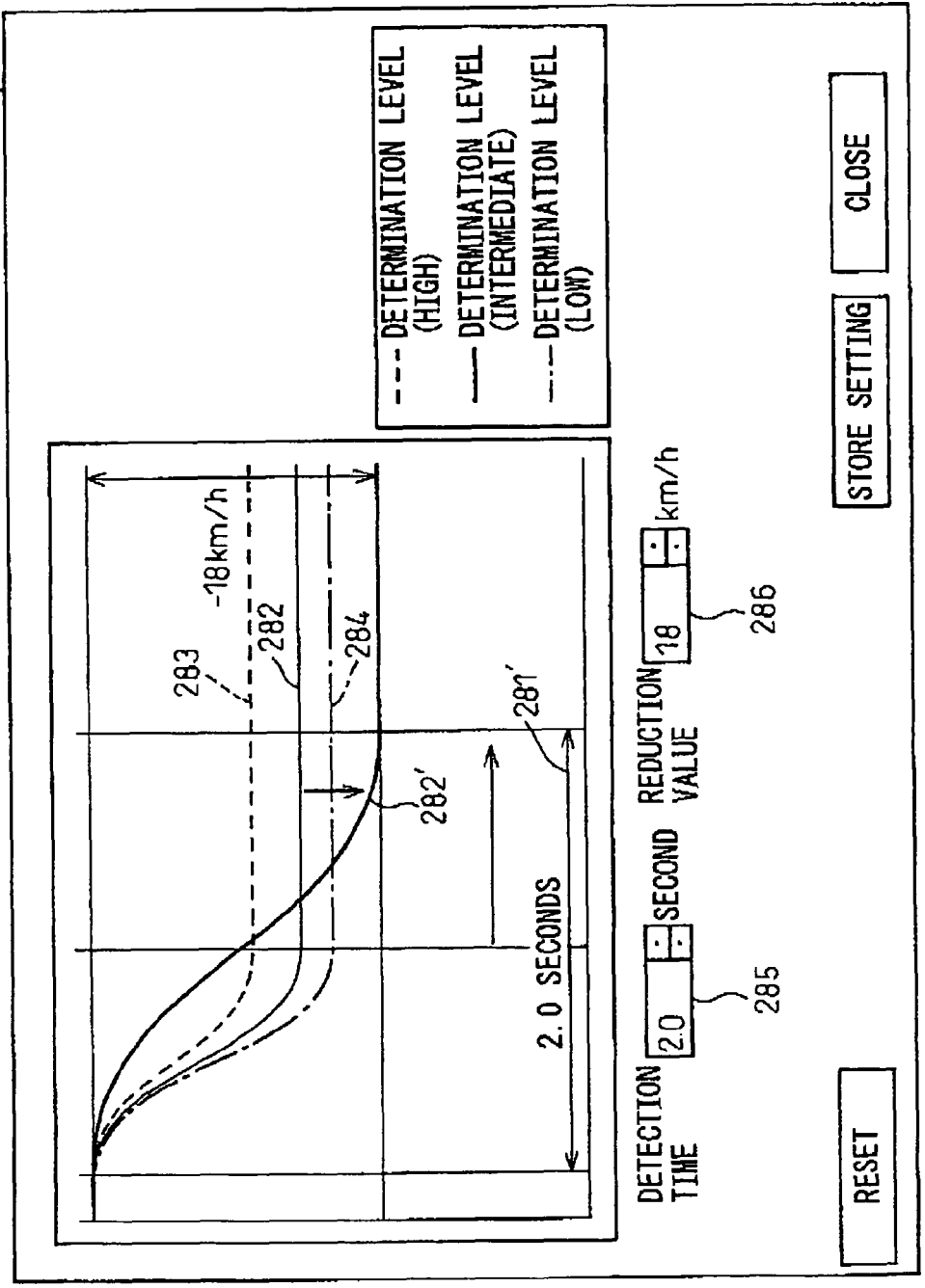

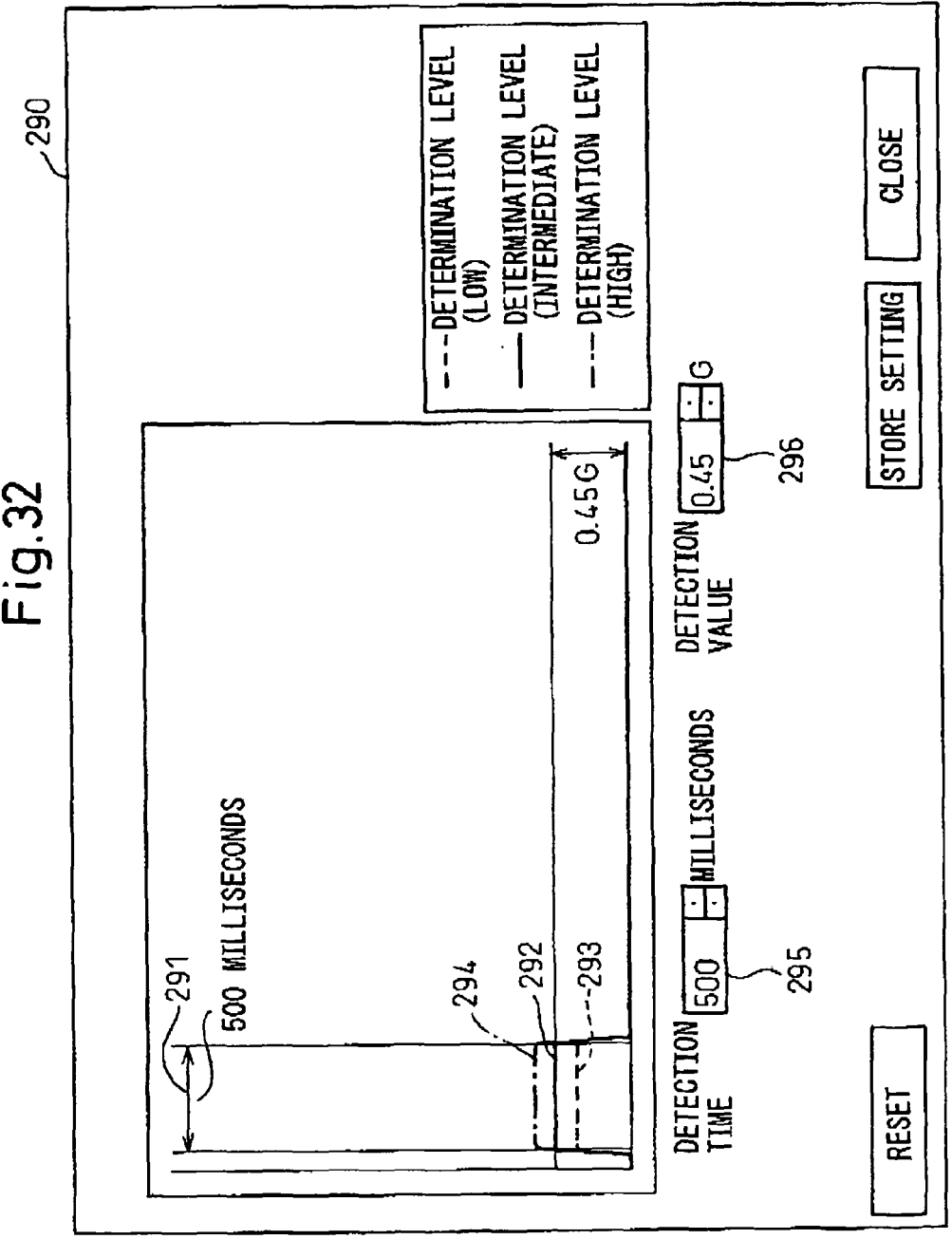

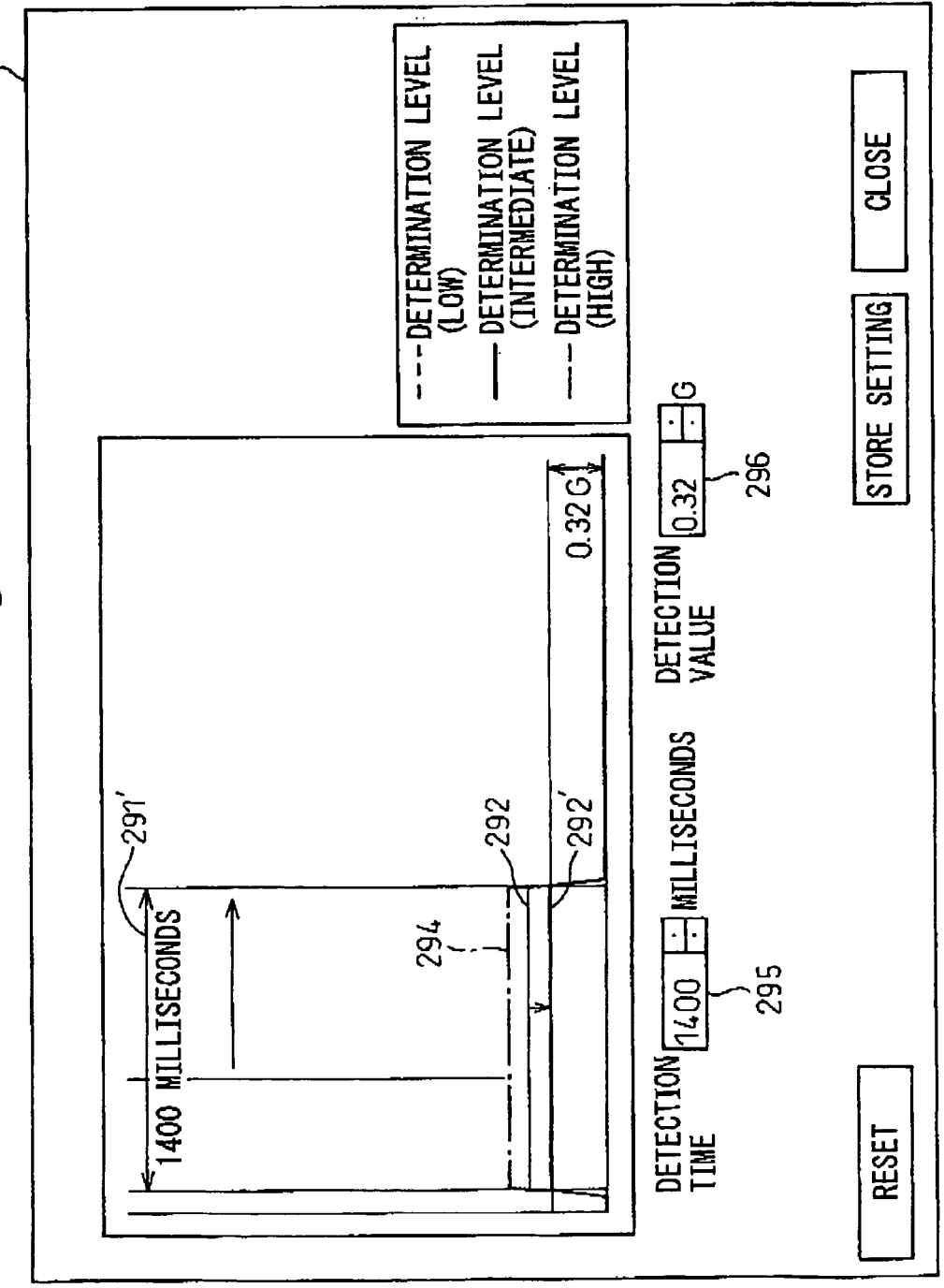

VEHICLE-RUNNING-STATE DISPLAY METHOD

This application is a new U.S. patent application that claims benefit of JP 2007-145872, filed on May 31, 2007, the entire content of JP 2007-145872 is hereby incorporated by reference.

FIELD OF THE INVENTION

The present invention relates to a vehicle-running-state display method, and specifically relates to a vehicle-running-state display method for displaying a vehicle running state based on vehicle operating information obtained by a drive recorder.

BACKGROUND OF THE INVENTION

Conventionally, a vehicle-mounted image recording device has been proposed, which is known as a drive recorder, that picks up an image of the surroundings of a vehicle by a camera installed in the vehicle, and a surrounding image and vehicle speed is then recorded when shock occurs to a vehicle due to a collision or rapid braking. By providing the drive recorder in a vehicle, when an accident occurs, it is possible to verify the cause of the accident by analyzing the recorded information. The drive recorder also raises ones consciousness with regard to safe driving, a recorded image of daily driving may be useful to improve driving safety.

Patent Documents 1 and 2 disclose a drive recorder that cyclically records an image picked up by a vehicle-mounted camera and records an image stored at the time of an accident onto another recording medium. Patent Documents 3 and 4 disclose a drive recorder that cyclically records data such as vehicle speed and gear shift position, and records running data stored at the time of an accident onto another recording medium.

A technique of displaying a track of a vehicle on a map screen based on running data is also known (for example, see Patent Document 5).

Patent Document 1: JP S63-16785-A
Patent Document 2: JP H06-237463-A
Patent Document 3: JP H06-331391-A
Patent Document 4: JP H06-186061-A
Patent Document 5: JP 2004-38489-A

SUMMARY OF THE INVENTION

There has been a demand for tracing in detail the state of a vehicle such as various dangerous situations while running, based on the operating information of a vehicle recorded by a drive recorder.

It is an object of the present invention to provide a vehicle-running-state display method capable of displaying a running state of a vehicle.

A vehicle-running-state display method according to the present invention, includes the steps of obtaining a special state of a vehicle based on position information, time information or speed information of a vehicle, displaying a track of the vehicle onto a map screen based on the position and the time information, and displaying a detected specific state of the vehicle onto the map screen.

Further, a vehicle-running-state display method according to the present invention, includes the steps of obtaining position information, time information and speed information of a vehicle, detecting a specific state of the vehicle based on the position information, the time information or the speed information, displaying a track of the vehicle onto a map screen based on the position and the time information, and displaying a detected specific state of the vehicle onto the map screen.

According to the vehicle-running-state display method of the present invention, a track of a vehicle and a specific vehicle running state are displayed. Therefore, the precise running state of the vehicle can be understood.

BRIEF DESCRIPTION OF THE DRAWINGS

FIG. 21 is a diagram showing a ranking-display screen example (1).

FIG. 22 is a diagram showing a ranking-display screen example (2).

FIG. 24 is a diagram showing a vehicle-trace screen example.

FIG. 25 is a diagram showing a speed-chart screen example.

FIG. 26 is a diagram showing a speed-excess-setting screen example (1).

FIG. 27 is a diagram showing a speed-excess-setting screen example (2).

FIG. 28 is a diagram showing a rapid-acceleration-setting screen example (1).

FIG. 29 is a diagram showing a rapid-acceleration-setting screen example (2).

FIG. 30 is a diagram showing a rapid-deceleration-setting screen example (1).

FIG. 31 is a diagram showing a rapid-deceleration-setting screen example (2).

FIG. 32 is a diagram showing a sharp-turn-setting screen example (1).

FIG. 33 is a diagram showing a sharp-turn-setting screen example (2).

DETAILED DESCRIPTION OF THE PREFERRED EMBODIMENTS

The embodiments of the present invention will be explained in detail below with reference to the drawings. It is to be understood that the scope of the present invention is not limited to these embodiments, and extends to the invention described in the claims and their equivalents. Various modifications to the present invention can be also implemented within a range not deviating from the gist of the present invention.

The recording of information in a drive recorder will be explained.

Figure 1:
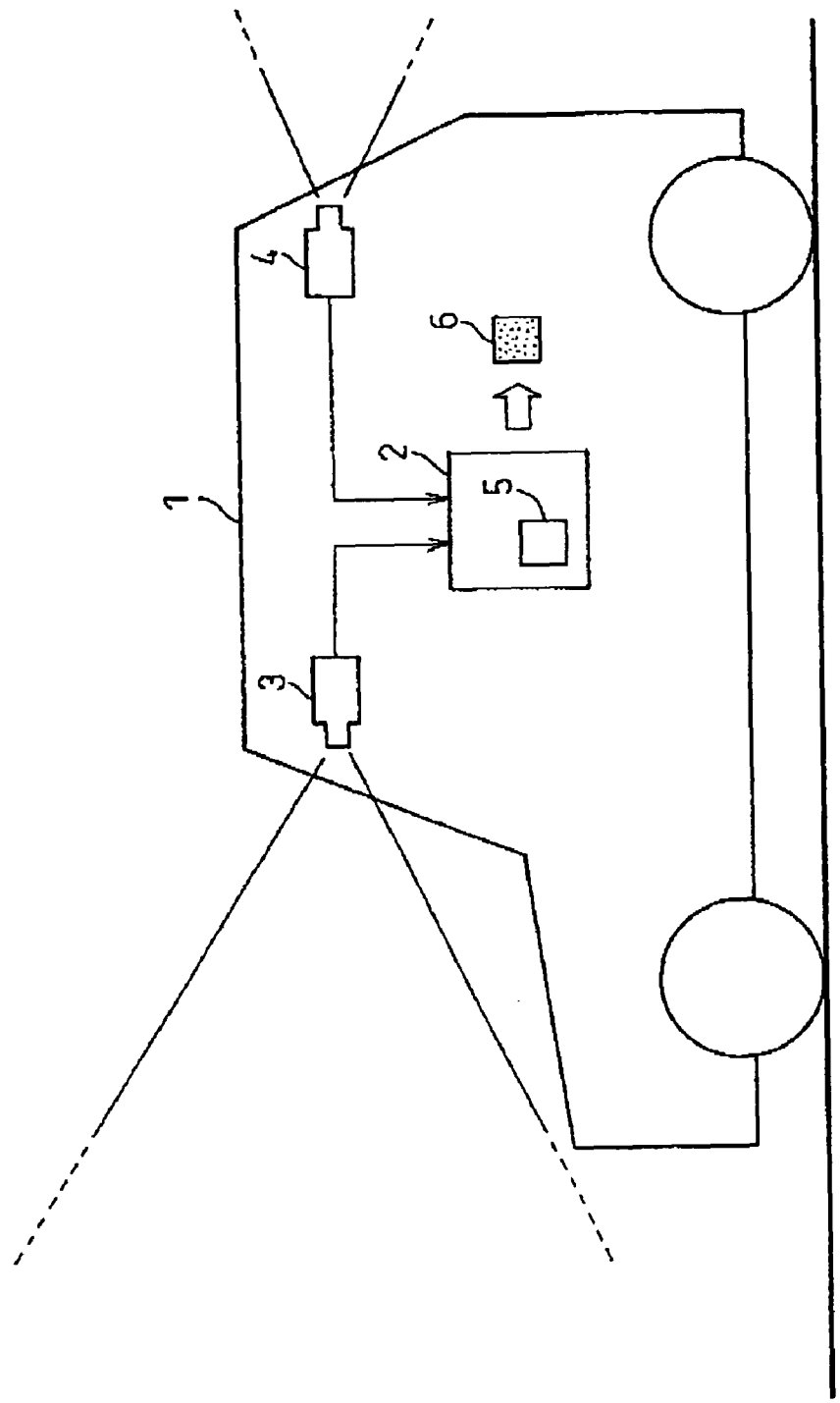
FIG. 1 is a diagram showing an example of a drive recorder mounted on a vehicle.

FIG. 1 is a diagram showing an example of a drive recorder mounted on a vehicle 1.

The drive recorder 2 is installed in the vehicle 1, and is connected to a video camera 3 that records an image of the front of the vehicle 1 and a video camera 4 that records an image of the back of the vehicle 1. Image information picked up by the video camera 3, etc., and is cyclically stored in a semiconductor memory unit within the drive recorder 2. When a predetermined recording condition is established, the image information stored in the semiconductor memory is recorded onto a memory card 6. The predetermined recording condition refers to a case in which impact is applied to the vehicle 1 due to an accident, etc. The details of which are described later.

The drive recorder 2 obtains vehicle speed information, in addition to the image information, and temporarily stores the information in the semiconductor memory unit within the drive recorder 2. When the above recording condition is established, the operating information is recorded onto the memory card 6 together with the image information. The operating information stored in the semiconductor memory unit at each predetermined time separately from this is arranged, and is recorded onto the memory card 6. The details of the operating information will be described later.

Figure 2:
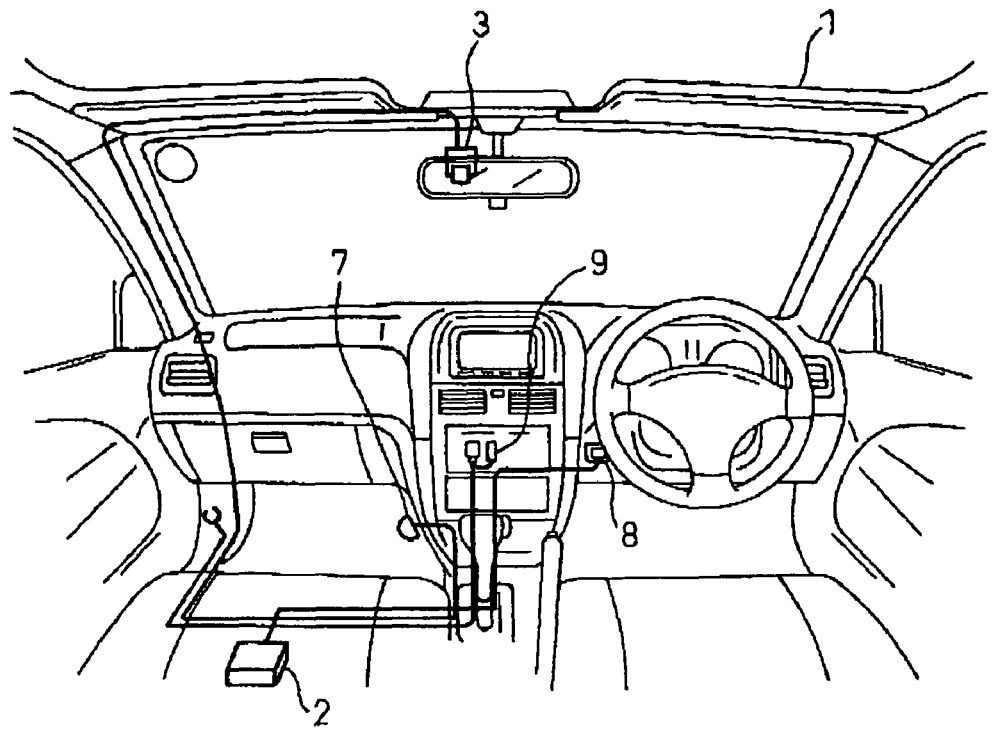
FIG. 2 is a diagram showing an example of a drive recorder installed in a vehicle.

FIG. 2 is a diagram showing an example of the drive recorder 2 installed in the vehicle 1.

The drive recorder 2 is electrically connected to the camera 3, a microphone 7, and an imaging switch 8. The camera 3 is fitted to a front glass surface at the rear side of a mirror within the vehicle, takes an image of the front of the vehicle, and transmits the image information to the drive recorder 2. The microphone 7 is installed near the foot at the side of the front passenger seat, and collects voice and sound within the vehicle 1. The imaging switch 8 is installed near the steering wheel. The operator can operate the imaging switch 8 to record the image information picked up by the camera 3 (or the camera 4) onto the drive recorder 2.

Figure 3:
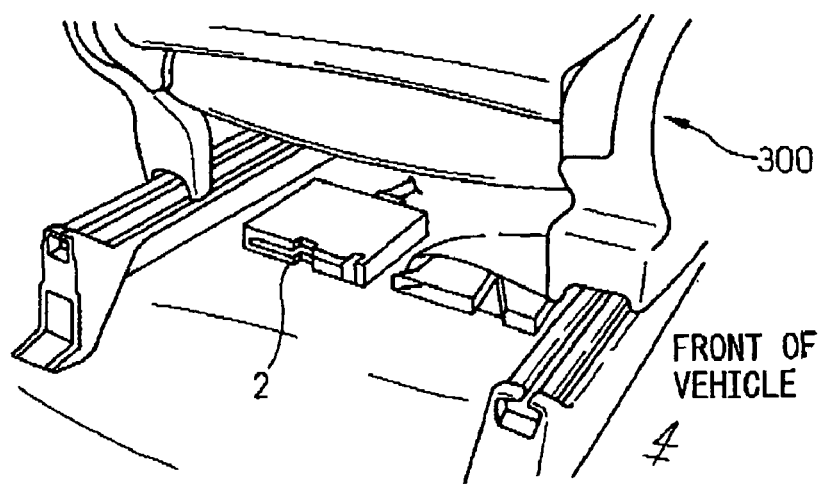
FIG. 3 is a diagram showing an example of a main body of a drive recorder installed in a vehicle.

FIG. 3 is a diagram showing an example of a main body of the drive recorder 2 installed in the vehicle 1.

The main body of the drive recorder 2 can be installed in a lower space of a front passenger seat 300. The main body is fixedly installed to record image information and the like when a impact is applied to the vehicle 1.

Figure 4:
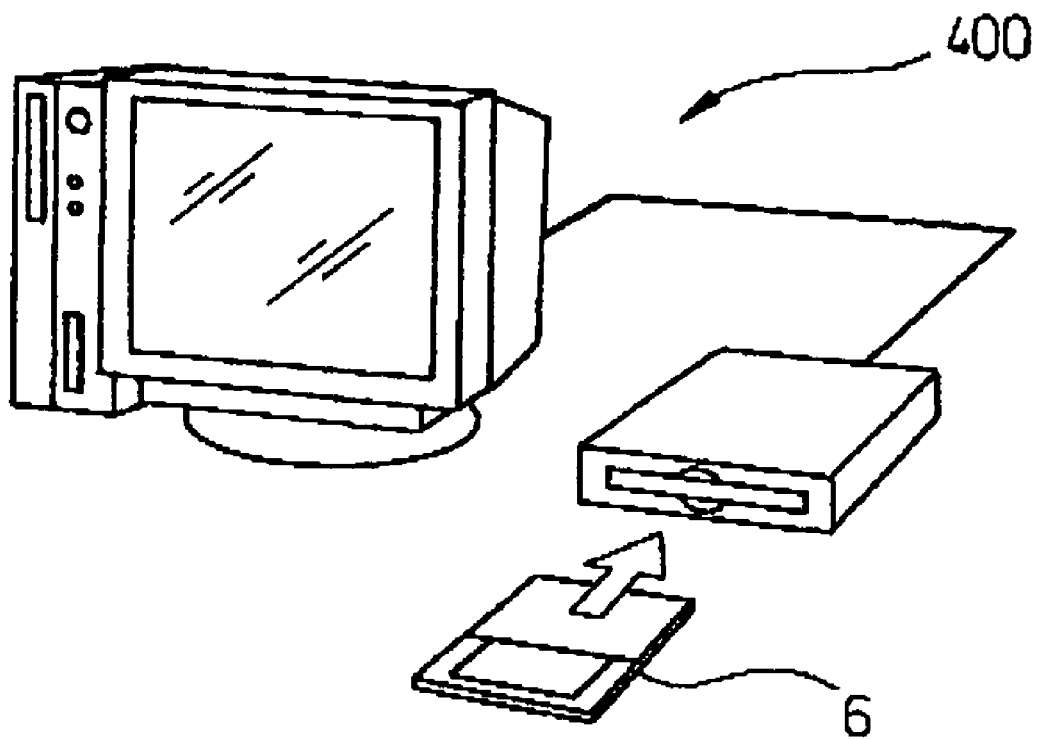
FIG. 4 is a diagram showing an example of a playback device.

FIG. 4 is a diagram showing an example of a reproducing device.

A reproducing device 400 configured by a personal computer and the like reproduces the image information and the operating information recorded in the memory card 6. The memory card 6 is inserted into an interface connected to the personal computer, and the image information and the operating information are read out. A user can identify the running state of the vehicle and the causes of the accident by verifying the image information and the operating information.

Figure 5:
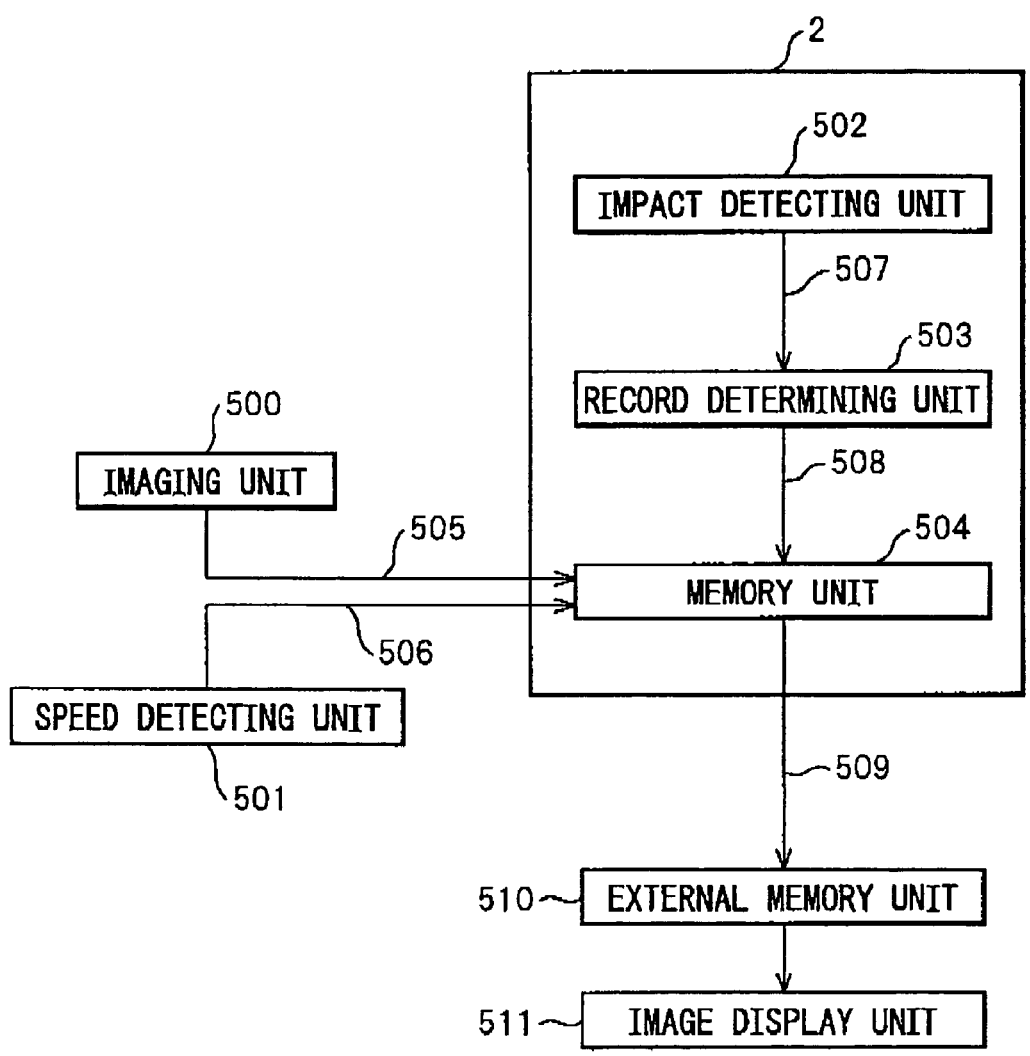
FIG. 5 is a block diagram showing a functional configuration of a drive recorder.

FIG. 5 is a block diagram showing a functional configuration of the drive recorder 2.

The drive recorder 2 is electrically connected to an imaging unit 500 and a speed detecting unit 501, and includes a impact detecting unit 502, a record determining unit 503, and a memory unit 504. The drive recorder 2 is mounted in the vehicle 1.

The imaging unit 500 is mounted in the vehicle 1, takes an image of the vehicle surroundings, and transmits image information 505 to the memory unit 504.

The speed detecting unit 501 is mounted on the vehicle 1, detects a speed of the vehicle 1, and transmits speed information 506 to the memory unit 504.

The shock detecting unit 502 detects, as gravity acceleration, an impact applied to the vehicle, and transmits the detected gravity acceleration information 507 to the record determining unit 503.

The record determining unit 503 determines whether or not the size of the shock detected by the shock detecting unit 502 is a shock corresponding to a vehicle accident or the like. When it is determined that the shock corresponds to a vehicle accident or the like, the record determining unit 503 transmits a record signal 508 which controls the recording, to the recording unit 504.

The memory unit 504 continuously cyclically stores the image information 505 and the speed information 506 received from the imaging unit 500 and the speed detecting unit 501. When the stored content reaches a limit, the memory unit 504 sequentially overwrites information onto the previous information, thereby continuously storing new image information and speed information. When receiving the record signal 508 from the record determining unit 503, the memory unit 504 transmits shock detection information 509 including the image information 505, the speed information 506, and the gravitational acceleration information 507 to an external recording unit 510.

The external recording unit 510 records the shock detection information 509 transmitted from the memory unit 504, in a nonvolatile manner. Because the external memory unit 510 is configured as a recording medium independent of the drive recorder 2, the shock detection information 509 can be removed from the drive recorder 2.

The shock detection information 509 recorded in the external recording unit 510 is transferred to an image display unit 511. The image display unit 511 displays this information as an image. Accordingly, the user of the drive recorder 2 can verify the state of the surrounding of the vehicle at the time of a vehicle accident by the recorded image.

Figure 6:
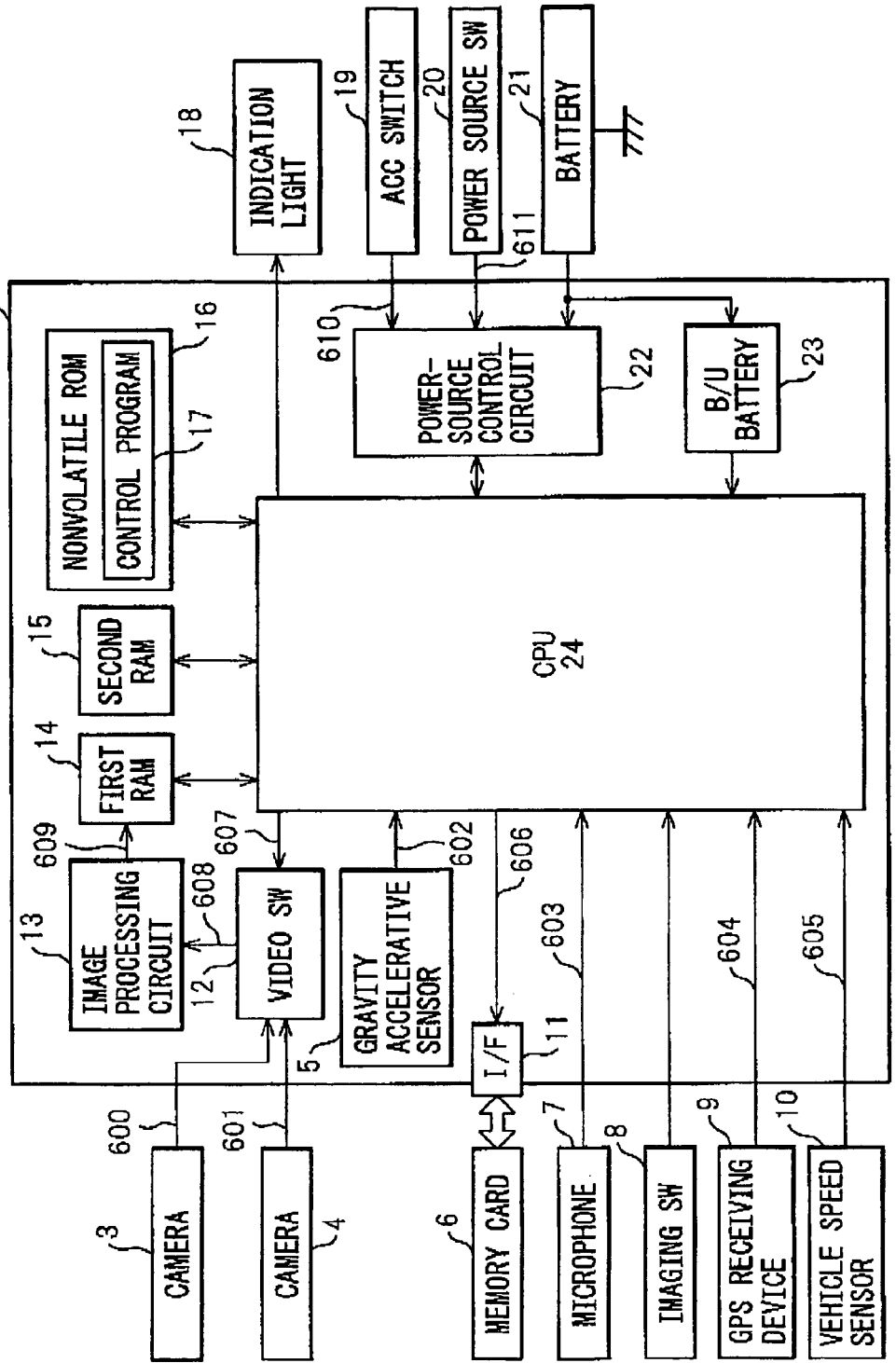
FIG. 6 is a block diagram showing an electric configuration of a drive recorder.

FIG. 6 is a block diagram showing an electric configuration of the drive recorder 2.

The drive recorder 2 can be configured separately from the camera 3 or the camera 4 as an exclusive image recording device, or can be configured integrally together with the camera 3, the camera 4, and the microphone 7 in the same casing. Alternately, the drive recorder 2 can be configured as one function of a vehicle-mounted navigation device.

The camera 3 is controlled to image the front of the vehicle 1 and output an analog video signal as image information 600, and includes a CCD image sensor (Charge Couple Device Image Sensor) and a CMOS image sensor (Complementary Metal Oxide Semiconductor Image Sensor) as a two-dimensional image sensor.

The camera 4 is installed in the vehicle 1 as a second camera, and is controlled to take an image of the back of the vehicle and the inside of the vehicle in a direction different from that of the camera 3, and output an analog video signal as image information 601. If only one camera is necessary, the camera 4 does not need to be connected.

The acceleration sensor 5 includes what is known as a G sensor (Gravity Accelerative Sensor) that detects a size of a shock applied to the vehicle 1 as a gravity acceleration. The acceleration sensor 5 includes semiconductors generating a current based on the gravity acceleration when a shock is received. The acceleration sensor 5 detects a size of the gravity acceleration in the front and back directions and the left and right directions of the vehicle, and outputs gravity acceleration information 602 to a CPU 24.

The memory card 6 is a recording medium extractable from the drive recorder 2, and includes a CF card (Compact Flash Card) and an SD card (Secure Digital Memory Card) as a programmable nonvolatile semiconductor memory card, and a memory stick. Image information and operating information are recorded onto the memory card 6.

While a memory card is used as an extractable recording medium in the present embodiment, the extractable recording medium is not necessarily limited to this, and another extractable memory card and hard disk can be also used. In place of the memory card 6, the drive recorder 2 can incorporate a hard disk. In this case, a transmission circuit is provided in the drive recorder 2, and the image information and the operating information recorded on the hard disk can be transmitted to the reproducing device 400 by radio communication. A navigation device mounted on the vehicle can be also used as a reproducing device. In this case, the image information and the operating information recorded on the memory card 6 or the hard disk can be transmitted to the navigation device via a harness. When the navigation device is used as a display, only the image information is transmitted to the navigation device, and is displayed on the display unit. Accordingly, when an accident occurs, the cause of the accident can be verified at the accident site.

The microphone 7 is electrically connected to the CPU 24, and is configured to collect voice and sound within or outside the vehicle 1, and transmit the collected sound as sound information 603 to the CPU 24. An analog/digital converter within the CPU 24 converts the sound information 603 into a digital signal. It is preferable to use a unidirectional microphone having high sensitivity on the front side of the microphone, to avoid unnecessary collection of noise on the road.

The imaging switch (imaging SW) 8 is operated by the user, and transmits a signal to the electrically connected CPU 24. Accordingly, the CPU 24 controls the recording of the image information and the operating information stored in a second RAM 15 onto the memory card 6, i.e. the imaging SW 8 is operated to establish recording conditions. Alternately, only the momentary image information when the imaging SW 8 is operated can be recorded into the memory 6.

A GPS (Global Positioning System) receiving unit 9 receives a signal containing data of a track of a satellite and time data from an atomic clock mounted on the satellite from plural GPS satellites, calculates the relative distance difference between each satellite and the GPS receiving unit from a time difference of received waves, and obtains the current position information of a vehicle. When radio waves emitted from three satellites are caught, the position of a vehicle on the plane on the earth can be determined. Upon detecting the current position information, the GPS receiving unit 9 transmits GPS information 604 containing the position information and the time information to the CPU 24.

A vehicle speed sensor 10 outputs a rotation of a rotor provided on a wheel axis of the vehicle 1 as a rotation pulse signal 605, and includes a magnetic sensor or an optical sensor. The CPU 24 calculates a wheel rotation number per unit time from a pulse signal received from the vehicle speed sensor 10, and calculates speed information of the vehicle 1.

The interface (I/F) 11 configures a slot of the memory card 6 provided in the drive recorder 2. The I/F 11 transfers record information 606 containing the image information and the operating information from the drive recorder 2, to the inserted memory card 6.

A video switch (hereinafter, "video SW") 12 is a switch which switches between cameras that take images when plural cameras are provided. In the present embodiment, the camera 3 and the camera 4 are connected to the video SW 12. The video SW 12 is configured to select one camera based on a selection signal 607 from the CPU 24, and output the image information from the selected camera as selection image information 608. The video SW 12 can be also configured to have a clock function and switch between cameras at a constant time interval.

An image processing circuit 13 converts the selection image information 608 input from the camera 3 and the like via the video SW 12, and generates and outputs image data 609. For example, the image processing circuit 13 includes a JPEG-IC (Joint Photographic coding Experts Group-Integrated Circuit), and generates data of the JPEG format. In this case, the JPEG-IC does not have a function of outputting data by assigning an address. Therefore, the image processing circuit 13 writes 30 files into a first RAM (Random Access Memory) 14 each second, and then overwrites each file.

The first RAM 14 temporarily stores the image data 609 converted by an image processing circuit 13. The first RAM 14 is connected to a DMA (Direct Memory Access) circuit within the CPU 24. One file out of three input images, i.e. ten files each second, are transferred to a second RAM 15 using the DMA circuit and are cyclically stored in the second RAM 15.

The second RAM 15 cyclically stores the image information and the operating information converted into the image data by the image processing circuit 13.

An SDRAM (Synchronous Dynamic Random Access Memory) is used, for example, for the first RAM 14 and the second RAM 15. SDRAM is designed to operate synchronously with the clock of the CPU. Therefore, the SDRAM has short input-and-output times, and can be accessed faster than a conventional DRAM (Dynamic Random Access Memory). Consequently, SDRAM is suitable to control the process of a large capacity of image data at high speed.

A nonvolatile ROM 16 stores a control program 17 and the like to collectively control hardware resources constituting the drive recorder 2. A mask ROM can be used for the nonvolatile ROM 16. When a flash memory, an EEPROM (Erasable Programmable Read Only Memory), and a ferroelectric memory as programmable nonvolatile semiconductor memories are used for the nonvolatile ROM 16, a program can be written into and erased from the nonvolatile ROM.

A control program 17 is stored in the nonvolatile ROM 16, and is read by the CPU 24 at the time of starting the drive recorder 2. The control program 17 functions as a program to control each unit and perform data process.

An indication light 18 includes a light-emitting diode or the like, and is lit during the activation of the drive recorder 2 by receiving power from the CPU 24, thereby notifying the user that the drive recorder 2 is being activated. When an abnormality occurs in the drive recorder 2, the CPU 24 makes the indication light 18 blink to notify the user of an abnormality.

An accessory switch (ACC switch) 19 is electrically integrated with an engine-start key switch provided in the vehicle 1. When the user turns the key switch, the ACC switch 19 transmits an accessory-on signal 610 to the drive recorder 2. Upon receiving the accessory-on signal 610 of the ACC switch 19, the drive recorder 2 starts the control. In place of the output signal of the ACC switch 19, an ignition key output signal can be also used.

When the user turns the switch, a power source switch (power source SW) 20 transmits a power-on signal to the drive recorder 2. The power source SW 20 can be used when it is desirable to operate the drive recorder without turning on the ACC switch 17.

A battery 21 is provided in the vehicle 1, and supplies electric power to the main body of the drive recorder 2. The battery also supplies electric power to a power source control circuit 22 and a backup battery 23. The battery 21 can be any battery that can be installed in the vehicle and can generate 12V.

The power source control circuit 22 is connected to the CPU 24, and receives the on-signal from the ACC switch 19, thereby supplying electric power from the battery 21 to the CPU unit 24 and the drive recorder 2. Upon detecting that the power source SW 20 is operated, the power source control circuit 22 starts supplying electric power regardless of the state of the ACC switch 19. Upon detecting that the ACC switch 19 or the power source SW 20 is off, the power source control circuit 22 transmits an end signal to the CPU 24. Upon receiving the end signal, the CPU 24 transmits an off-signal to the power source control circuit 22 as a control end signal. Accordingly, the power source control circuit 22 stops supplying electric power.

The backup battery (B/U battery) 23 includes a capacitor and the like, and is connected to supply electric power from the battery 21 to the CPU unit 24 and the drive recorder 2. When a shock is applied to the vehicle by a collision or the like, there is a risk that the battery 21 may be damaged, or the battery 19 and the power source control circuit 22 may be disconnected. In this case, the B/U battery 23 supplies stored power source to the CPU 24 and the like, thereby backing up the power source of the drive recorder 2.

The CPU (Central Processing Unit) 24 operates as a control device of the drive recorder 2, and includes a microcomputer and the like. The CPU 24 controls the components contained in the drive recorder 2 and processes the data based on the control program 17.

Figure 7:
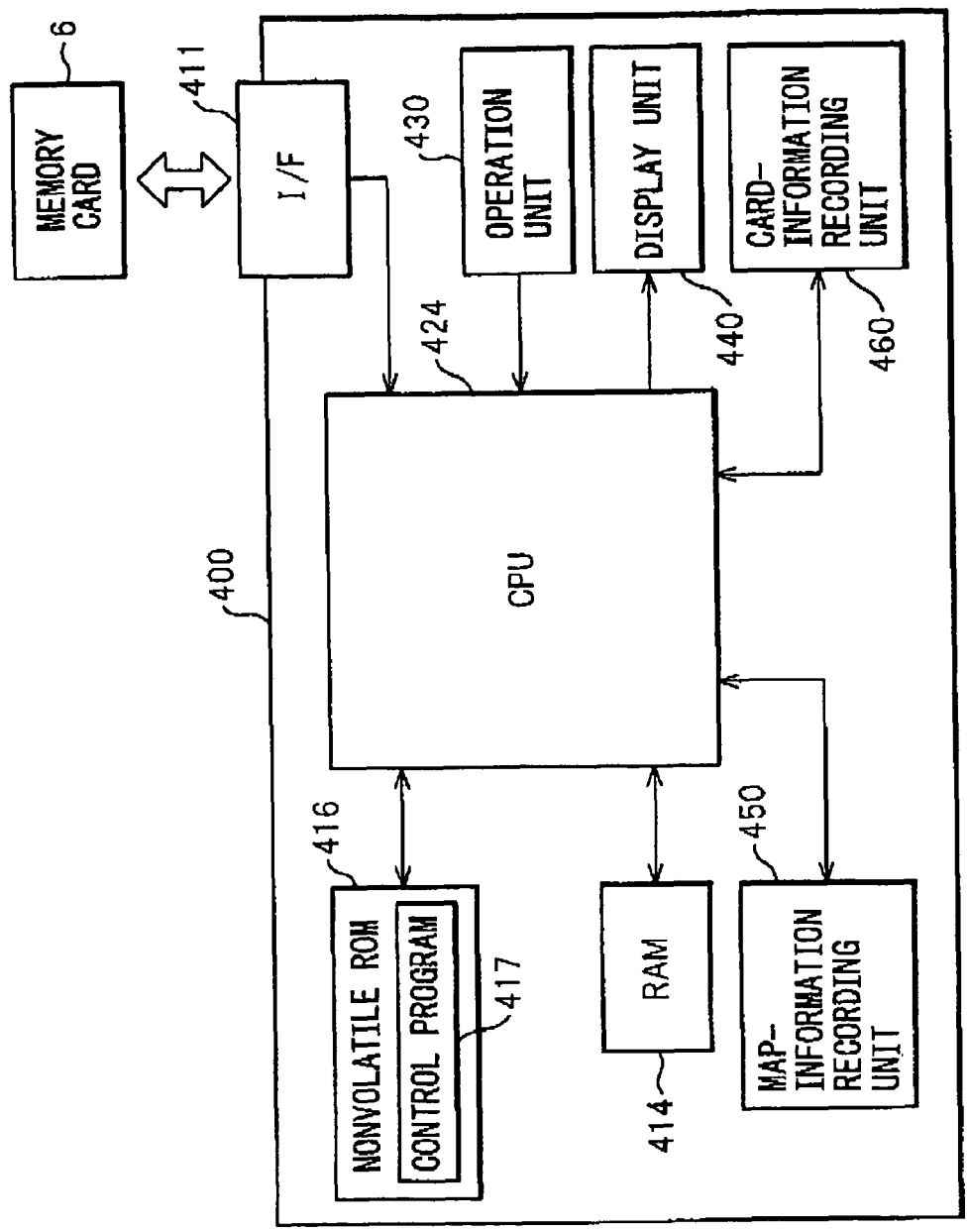
FIG. 7 is a block diagram showing an electric configuration of a reproducing device.

FIG. 7 is a block diagram showing an electric configuration of the reproducing device 400.

An interface (I/F) 411 configures an entry, which is known as a slot unit, of the memory card 6 provided in the reproducing device 400. The I/F 411 transfers the image information and the operating information recorded in the memory card 6 to the reproducing device 400.

A RAM 414 is used to temporarily store data when a CPU 424 processes the image information and the information process of the operating information transferred from the memory card 6. An SDRAM is used for the RAM 414, for example.

A nonvolatile ROM 416 stores a control program 417 and the like to collectively control hardware resources constituting the reproducing device 400. An EEPROM and a ferroelectric memory are used as the nonvolatile ROM 16.

A control program 417 is stored in the nonvolatile ROM 416, and is read by the CPU 424 when starting the playback device 400. The control program 417 functions as a program to control each unit and perform data process.

A CPU 424 controls the playback device 400, and includes a microcomputer and the like. The CPU 424 controls the playback device 400 and processes the data based on the control program 417.

An operation unit 430 includes a keyboard and a mouse. When a user operates the playback device 400, the operation unit 430 is used to input the data to the CPU 424.

A display unit 440 includes a liquid-crystal display unit and the like, and is used to appropriately display the image information and the operating information recorded in the memory card 6.

A map-information recording unit 450 includes a recording medium such as a hard disk and a DVD, and contains map information, road information and speed limit information.

A card-information recording unit 460 includes a recording medium such as a hard disk, and is used to record the image information and the operating information recorded in the memory card 6.

Next, a recording procedure of the image information and the operating information in the drive recorder 2 will be explained.

The CPU 24 alternately obtains still image data picked up by the cameras 3 and 4, at the rate of ten images per one second (i.e., the CPU 24 alternately obtains the still image from the camera 3 at every 0.2 second and the still image from the camera 4 at every 0.2 second), and cyclically records the still image data into the second RAM 15 via the first RAM 14. The CPU 24 obtains the operating information each time when the still image data by the cameras 3 and 4 is obtained, and cyclically records the obtained operating information into the second RAM 15. Further, the CPU 24 periodically and cyclically records the operating information into the second RAM 15 independently of obtaining the still image data. The above time interval and the number of the still image data obtained by the CPU 24 are one example, and are not limited to these numbers.

Upon detecting a recording condition described later, the CPU 24 transfers and records from the second RAM 15 into the memory card 6, the image information (300 still images each time when one recording condition is established) and the operating information during a total of 30 seconds, including 15 seconds before and 15 seconds after the recording condition, respectively. The image information and the operating information recorded in the memory card 6 can be displayed by the reproducing device 400. Therefore, the user of the drive recorder 2 can verify the running state and the accident condition of the vehicle 1. The above period (15 seconds before the establishment of the recording condition and 15 seconds after the establishment of the recording condition) during which the CPU 24 records the information when the recording condition is established is one example, and is not limited to this time.

Independent of the recording condition, the CPU 24 transfers and records, collectively every ten seconds, the operating information every one second within the operating information stored in the second RAM 15, from the second RAM 15 into the memory card 6, i.e., each one second of operating information is recorded into the memory card 6 every ten seconds, irrespectively of the establishment of the recording condition described later. The above interval at which the CPU 24 records the operating information and the timing at which the CPU 24 records the information into the memory card 6 are one example, and are not limited to these values. Since the operating information is recorded every ten seconds when the operating information is recorded at every one second, access to the memory card becomes frequent, and this may increase the overhead load. Further, upon detecting dangerous-driving conditions used to detect a dangerous driving, which are different from the recording conditions, the CPU 24 records the operating information at the detection time and event data indicating the dangerous-driving condition, into the memory card 6. The above operating information at every one second and the operating information indicating the dangerous operation are also used as violation codes.

When the following three conditions are satisfied, the recording condition is established.

1. G detection:

When the acceleration sensor 5 detects gravitational acceleration equal to or higher than a predetermined threshold value. Specifically, assuming that Gy represents gravitational acceleration in the front and back directions of the vehicle 1, and Gx represents gravitational acceleration in the left and right directions of the vehicle 1. When the CPU 24 detects at every ten seconds an absolute value $(Gx^2+Gy^2)^{0.5}$ of combined gravitational acceleration of the outputs from the acceleration sensor 5, and also when a value equal to or higher than the threshold acceleration is detected continuously during a threshold continuous time, it is determined that the recording condition is established. The threshold acceleration can be set to 0.40 G, and the threshold continuous time can be set to 10 milliseconds. These cases are set as a condition of establishing the recording condition, because it can be recognized that a collision accident of the vehicle 1 occurs in these cases. A detailed setting will be described later.

2. Speed Trigger:

When a speed difference within a predetermined period of the vehicle 1 detected by the vehicle speed sensor 10 becomes equal to or higher than a threshold value. Specifically, running at or above 60 km/h, when deceleration during one second becomes equal to or above 14 km/h, it is determined that the recording condition is established. This case is set as a condition of establishing the recording condition, because when the vehicle 1 causes this speed change, this can be recognized as the occurrence of an accident or the imminent danger of an accident. A detailed setting is described later.

3. Imaging SW:

The imaging SW is operated.

When any one of the above recording conditions is established, the CPU 24 transfers and records from the second RAM 15 into the memory card 6, the image information and the operating information during a total of 30 seconds, including 15 seconds before and 15 seconds after the establishment of the recording condition, respectively. When the recording condition is established, the CPU 24 records the information together with event data (data indicating any one of the above three) indicating the established recording condition, into the memory card 6. It can also be configured so that when the recording condition is established, the sound information obtained from the microphone 7 for a total of 30 seconds, including 15 seconds before and 15 seconds after the establishment of the recording condition, respectively, is recorded together with the image information into the memory card 6.

The operating information includes the following information.

1. The information regarding Gravity acceleration (Gy, Gx) detected from the acceleration sensor 5.

2. The information regarding a position of the vehicle 1 and a time detected from the GPS receiving unit 9.

3. The information regarding speed detected from the vehicle speed sensor 10.

4. The information regarding ON/OFF state of the ACC switch 19.

The content of the operating information is not necessarily limited to the above information, and can also contain information of a lighting state of a light such as an indicator and operation and running of the vehicle 1 such as an angle of the steering wheel.

The memory card 6 is separately recorded with data including the recording condition, a specific ID of the memory card 6, and an ID or name of a user (for example, a taxi driver) who uses the memory card 6. As described above, a condition of performing an image recording is called a "recording condition", a condition of recording only the operating information is called a "dangerous-driving condition", and both conditions are collectively called "trigger conditions".

Display of information in the reproducing device 400 will be explained next.

Figure 8:
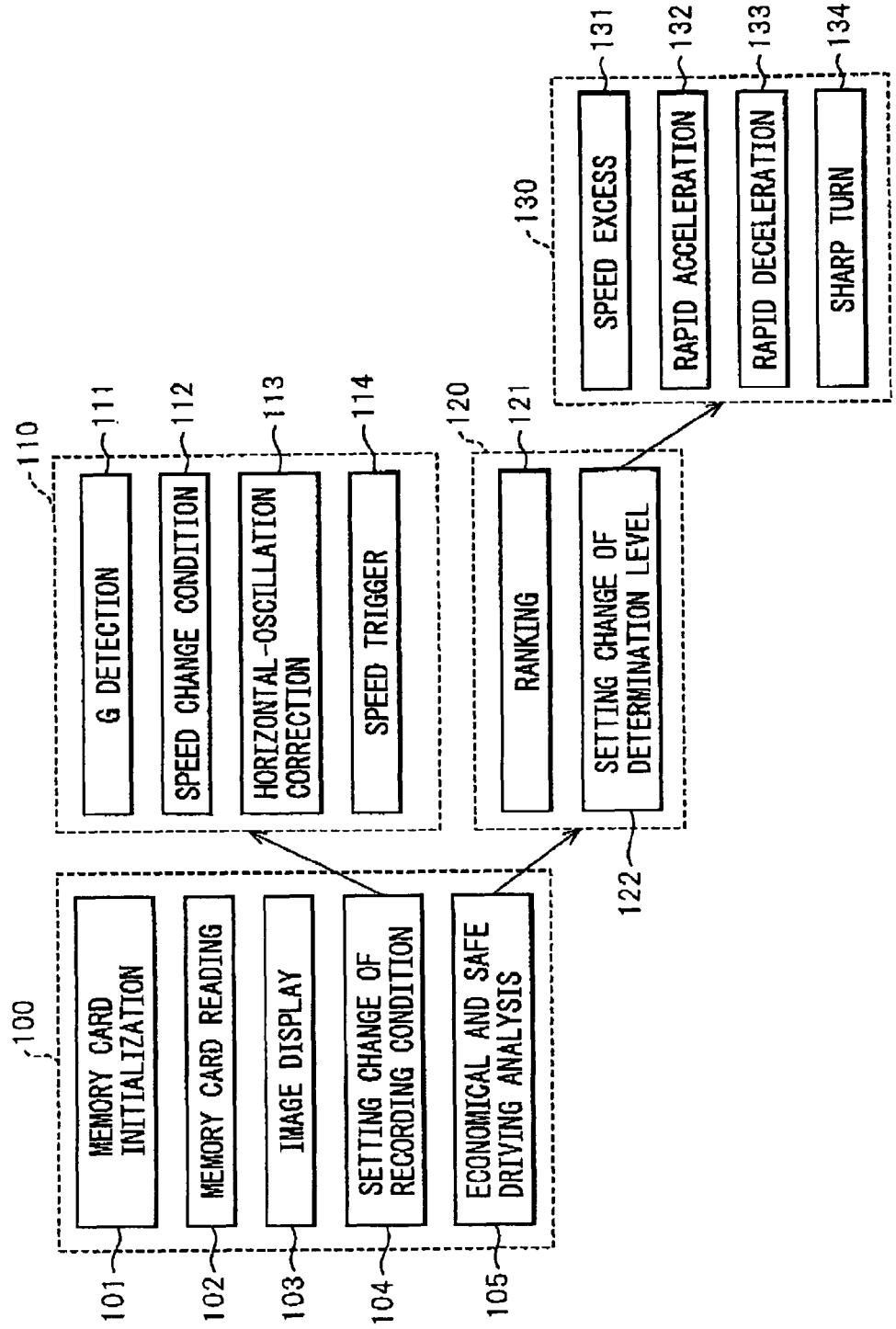
FIG. 8 is a diagram showing an example of a menu screen in a playback device 400.

FIG. 8 is a diagram showing a menu screen example in the playback device 400.

Figure 9:
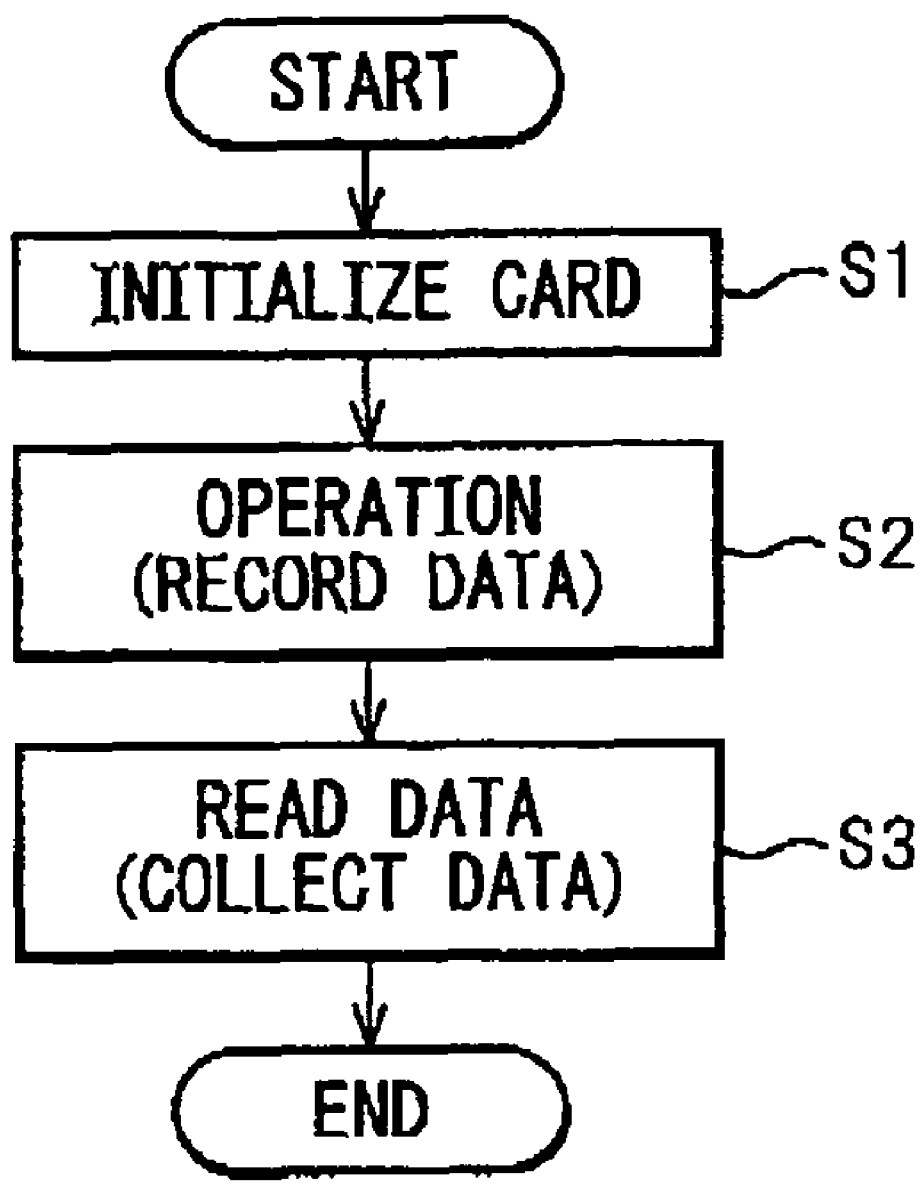
FIG. 9 is a diagram showing an example of a flow of an operation of a memory card 6.

When the power source of the playback device 400 is turned ON, the display unit 440 displays a first screen 100 displaying five menu items 101 to 105. In the first screen 100, when the user operates the operation unit 430 to select the "setting change of recording condition" item 104, four items shown in a second screen 110 are displayed. When the user operates the operation unit 430 to select the "economical and safe driving analysis" item 105, two items shown in a third screen 120 are displayed. In the third screen 120, when a "setting change of determination level" item 123 is selected, four items shown in a fourth screen 130 are displayed. Details of each item are described later;

FIG. 9 is a diagram showing a flow of an operation example of the memory card 6.

First, in the reproducing device 400, the user selects the "memory card initialization" item 101 in the first screen 100 shown in FIG. 8, and initializes a memory card by inserting a card into the I/F 411 of the reproducing device 400 (S1). When initializing the card, the data recorded into the memory card 6 by the CPU 424 is deleted. A trigger condition such as the recording condition and the newly set dangerous-driving condition, which will be described later, and the ID of the user (for example, a taxi driver) who performs the operation using the memory card 6 are written into a predetermined address of the memory card 6.

Next, the user inserts the initialized memory card 6 into the I/F 11 of the drive recorder 2, when starting of the vehicle 1 (for example, when a taxi driver starts a day shift (7:45 to 17:15)), and starts data recording (S2). When the memory card 6 is inserted into the I/F 11 of the drive recorder 2, the CPU 24 reads the trigger condition recorded in the memory card 6, and records the read trigger condition into the second RAM 15 and the like. Based on the trigger condition set this time, the CPU 24 determines whether the recording condition is established. As described above, when the recording condition is established, the CPU 24 records the image information and the operating information into the memory card 6 during a predetermined period (30 seconds, for example). When the dangerous-driving condition is established, the CPU 24 records the operating information at the time of the condition, into the memory card 6. The CPU 24 also records the operating information during a predetermined period (one second, for example), each the memory card 6 at each predetermined period (ten seconds, for example).

At the end of the operation of the vehicle 1 (for example, when the taxi driver ends the day shift), the user takes out the memory card 6 recorded with the data, from the I/F 11 of the drive recorder 2. The user further selects in the playback device 400 the "memory card reading" item 102 of the first screen 100 shown in FIG. 8, inserts the memory card 6 into the I/F 411 of the playback device 400, and reads the image information, the operating information, the trigger condition, the memory card ID, and the user ID recorded in the memory card 6, into the playback device 400 (S3).

At the playback device 400 side, the CPU 424 reads the image information, the operating information, the trigger condition, the memory card ID, and the user ID recorded in the memory card 6, corresponding to the operation of the vehicle 1. The playback device 400 can individually analyze the data for each memory card, or can collectively analyze the data, after reading the data corresponding to plural operations of plural vehicles from plural memory cards 6. Further, one memory card 6 can be used for plural vehicles or can be used for plural operations.

Figure 10:
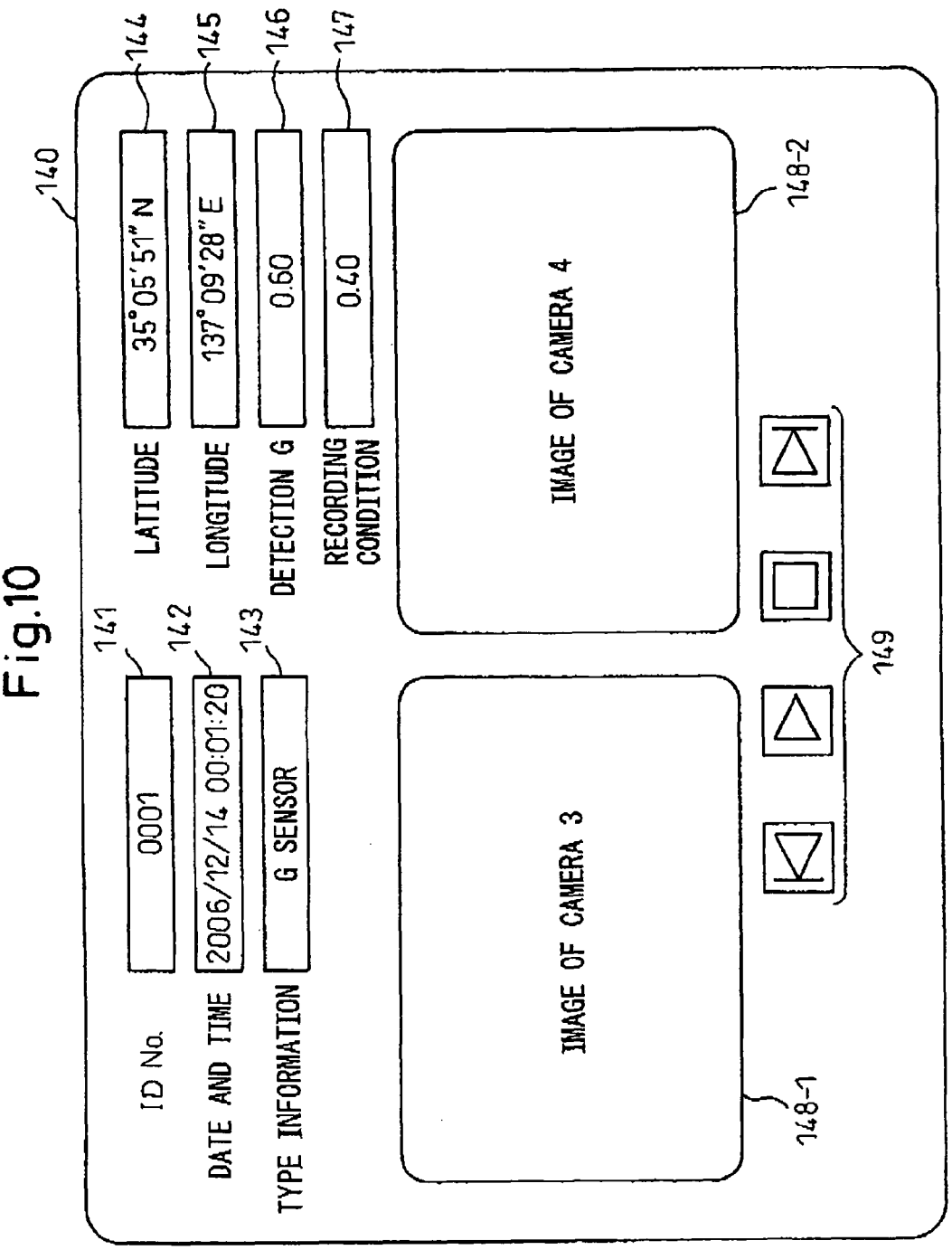
FIG. 10 is a diagram showing a screen example in which display image information is recorded in the memory card 6.

FIG. 10 is a diagram showing a screen example for displaying the image information recorded in the memory card 6. The CPU 20 performs the display process on all screens and the user operation on the screen described later.

When the user selects the "image display" item 103 of the first screen 100 shown in FIG. 8 in the playback device 400, a screen 140 shown in FIG. 10 is displayed. The CPU 424 displays the screen 140 in the display unit 440, based on the data stored in the card information memory unit 460, following the control program 417.

As shown in FIG. 10, the screen 140 displays ID number data of the memory card 6, time information 142 contained in the operating information, type information 143 showing the established recording condition, latitude data 144 within the position information, longitude data 145 within the position information, detection G information 146 showing an absolute value of combined gravity acceleration, recording condition information 147 when a displayed image is picked up, a region 148-1 sequentially displaying still images picked up by the camera 3, a region 148-2 sequentially displaying still images picked up by the camera 4, and an operation button 149 (rewinding, reproduction, stop, fast forwarding). The detection G information 146 showing the absolute value of the combined gravity acceleration is obtained and displayed by calculation, by the CPU 424, based on the gravity acceleration information (Gy, Gx) detected from the acceleration sensor 5 contained in the operating information detected when the images displayed in the regions 148-1 and 148-2 are picked up, i.e., the detection G information 146 shows ground acceleration when the recording condition based on the G detection is established.

In the screen 140 shown in FIG. 10, the user controls the operation button 149, thereby sequentially displaying 150 still images for 15 seconds picked up by the camera 3 and 150 still images for 15 seconds picked up by the camera 4, by changing over between the display regions 148-1 and 148-2. At the same time, the information corresponding to the displayed still images are displayed in the display-and-input regions 141 to 147. The screen 140 shown in FIG. 10 is one example, and other screen configuration can be also selected.

In the present embodiment, as shown in FIG. 10, the recording condition corresponding to the displayed still image is displayed onto the same screen as that of the still image. Therefore, the user can easily determine whether or not the recording condition is reasonable while watching the image. When it is determined that the recording condition is not reasonable, the change of the setting of the recording condition described later can be performed. Accordingly, the setting of the recording condition can be appropriately changed.

While the recording condition and the image are displayed onto the same screen in FIG. 10, both are not necessarily required be displayed onto the same screen. For example, an operation button can be arranged to display the recording condition which is displayed onto the same screen as that of the image, and when the operation button is depressed, the recording condition is displayed as a separate window. Based on this configuration, whether the recording condition is reasonable can be also easily determined, although this increases the numbers of times the operation button is depressed.

The setting change of the recording condition will be explained next.

Of the above three recording conditions, the G detection and the speed trigger can be optimized by changing either both or one of the threshold value and the setting value, depending on the establishment of the recording condition. For example, when the threshold value is set high, the image information is recorded only when a serious accident occurs, and this has a risk that image information is not recorded when a minor accident occurs. On the other hand, when the threshold value is set low, the image information is recorded even when rapid acceleration or rapid deceleration does not lead to an accident. Therefore, in the embodiment of the present invention, a procedure by which the recording condition is appropriately changed, is provided.

FIG. 10 shows both the detection G 146 and the recording condition 147, because at the playback device 400 side, the timing of changing the setting of the recording condition such as the G detection value is different, in some cases, from the timing of recording the image based on the setting value of the recording condition of the detection G initialized in the memory card.

For example, assuming that in the playback device 400, the value of the detection G is increased from 0.40 G to 0.60 G while reviewing various images, there is a possibility that many memory cards 6 have already been installed in the drive recorder 2 of each vehicle, and the images have been recorded when the setting is changed. In this case, when data is transmitted to and recorded into the playback device 400 from the memory card 6 in which an image is recorded without changing the recording condition (i.e., the detection G is 0.40 G), there is a possibility that a misunderstanding may occur at the playback device 400 side because the image is recorded in the condition of the low detection G regardless of changing of the setting of the recording condition. Therefore, it is possible to prevent the occurrence of this misunderstanding, by displaying the recording condition 147 on the display screen shown in FIG. 10.

In other words on the side of the playback device 400, the user may easily misunderstand that the image is recorded according to the latest recording condition. However, the image is actually recorded in the previous condition which is not changed. To avoid this problem, displaying the recording condition 147 is very significant.

Figure 11:
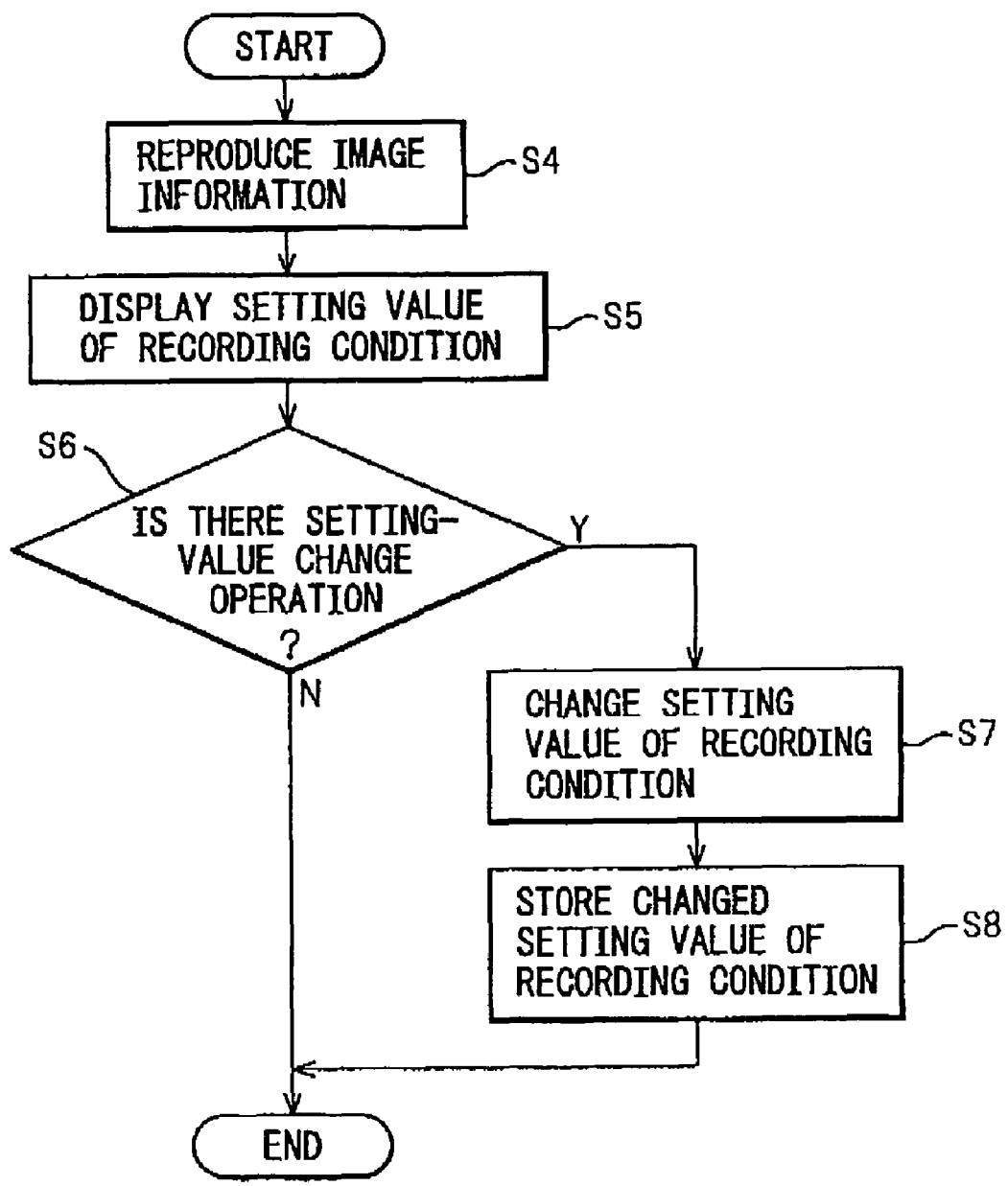
FIG. 11 is a diagram showing an example of a setting-change flow of a recording condition.

FIG. 11 is a diagram showing an example of a setting-change flow of a recording condition.

First, the user selects the "image display" item 103 in the first screen shown in FIG. 8, and the CPU 424 detects the operation, and reproduces the image information together with the recording condition (S4).

When the user decides that the image information has been recorded only for a serious accident or a lot of extraneous image information has been recorded, the user determines that the recording condition is inappropriate, and selects the "setting change of the recording condition" in the first screen 100 shown in FIG. 8. The CPU 424 detects this operation, and displays the second screen 110 shown in FIG. 8 into the display unit 440. Further, the user selects items 111 to 114 shown in the second screen 110, and the CPU 424 detects this operation, and displays setting values of detailed recording conditions in the recording-condition setting screen described later (S5). In the second screen 110, the "G detection" item 111, the "speed change condition" item 112, and the "horizontal-oscillation correction" item 113 are setting-change items concerning the G detection of the recording condition. However, all of the above three settings are not always required to change. The "speed trigger" item 114 is set for the speed trigger in the recording condition described above.

When the user determines that the setting value needs to be changed as a result of investigating the setting value of the recording condition, the user changes the setting value in the recording-condition setting screen. When the CPU 424 detects the change operation (S6), the CPU 424 changes the setting value according to the operation (S7), and can store the change (S8).

Figure 12:
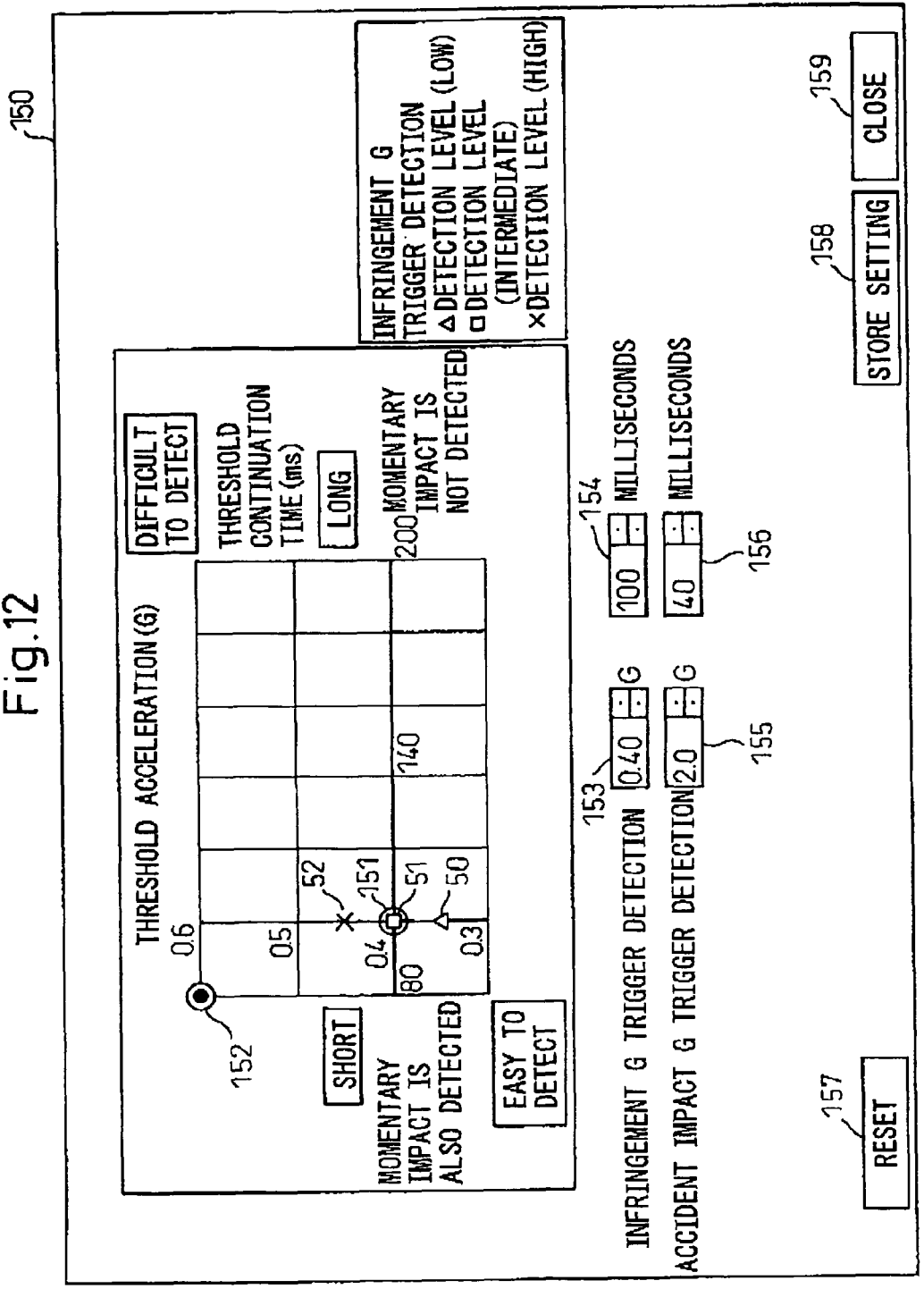
FIG. 12 is a diagram showing a G-detection setting screen example (1).

FIG. 12 is a diagram showing a G-detection setting screen example (1).

When the user selects the "G detection" item 111 in the second screen 110, a screen 150 shown in FIG. 12 is displayed on the display unit 440.

The screen 150 displays a graph showing threshold acceleration (0.3 to 0.6) in the Y axis, and threshold continuation time (80 to 200 milliseconds) in the X axis. The graph shows an violation G trigger 151 and an accident shock G trigger 152 that are set at the current time. A threshold acceleration of the violation G trigger 151 is displayed on a display-and-input region 153, and a threshold continuation time is displayed on a display-and-input region 154. A threshold acceleration of the accident shock G trigger 152 is displayed in a display-and-input region 155, and a threshold continuation time is displayed on a display-and-input region 156. A numerical value of the accident shock G trigger 152 is not present on the graph, and is therefore provisionally displayed at the left upper end of the graph.

The violation G trigger 151 and the accident shock G trigger 152 shown in the screen 150 correspond to the detailed setting values of the above-described detection of the recording condition. In this example, two kinds of setting values concerning the G detection are provided considering the size of the vehicle 1 and the detection condition of the acceleration sensor 5. However, one kind of setting value may be sufficient.

The user clicks with the mouse the violation G trigger 151 displayed in the graph, and moves to another position on the graph, thereby easily changing the setting of the G trigger. According to the change of the position of the violation G trigger 151 on the graph, the setting values of the display-and-input regions 153 and 154 are changed. This also applies to the accident shock G trigger 152. Setting values can be directly input to the display-and-input regions 153 to 156, thereby changing the setting of the G triggers. In this case, the positions of the triggers 151 and 152 on the graph automatically change according to the values input to the display-and-input regions 153 to 156.

FIG. 12 displays indicators of detection levels of the violation G trigger at three stages in the graph, thereby providing the user with indications of the setting, i.e., a low detection level is set as "Δ" 50 and is displayed at a position of 0.35 G and 100 milliseconds, an intermediate detection level is set as "□" 51 and is displayed at a position of 0.40 G and 100 milliseconds, and a high detection level is set as "×" 52 and is displayed at a position of 0.45 G and 100 milliseconds. Based on these indications, the user can change the setting to obtain a desired detection level.

Figure 13:
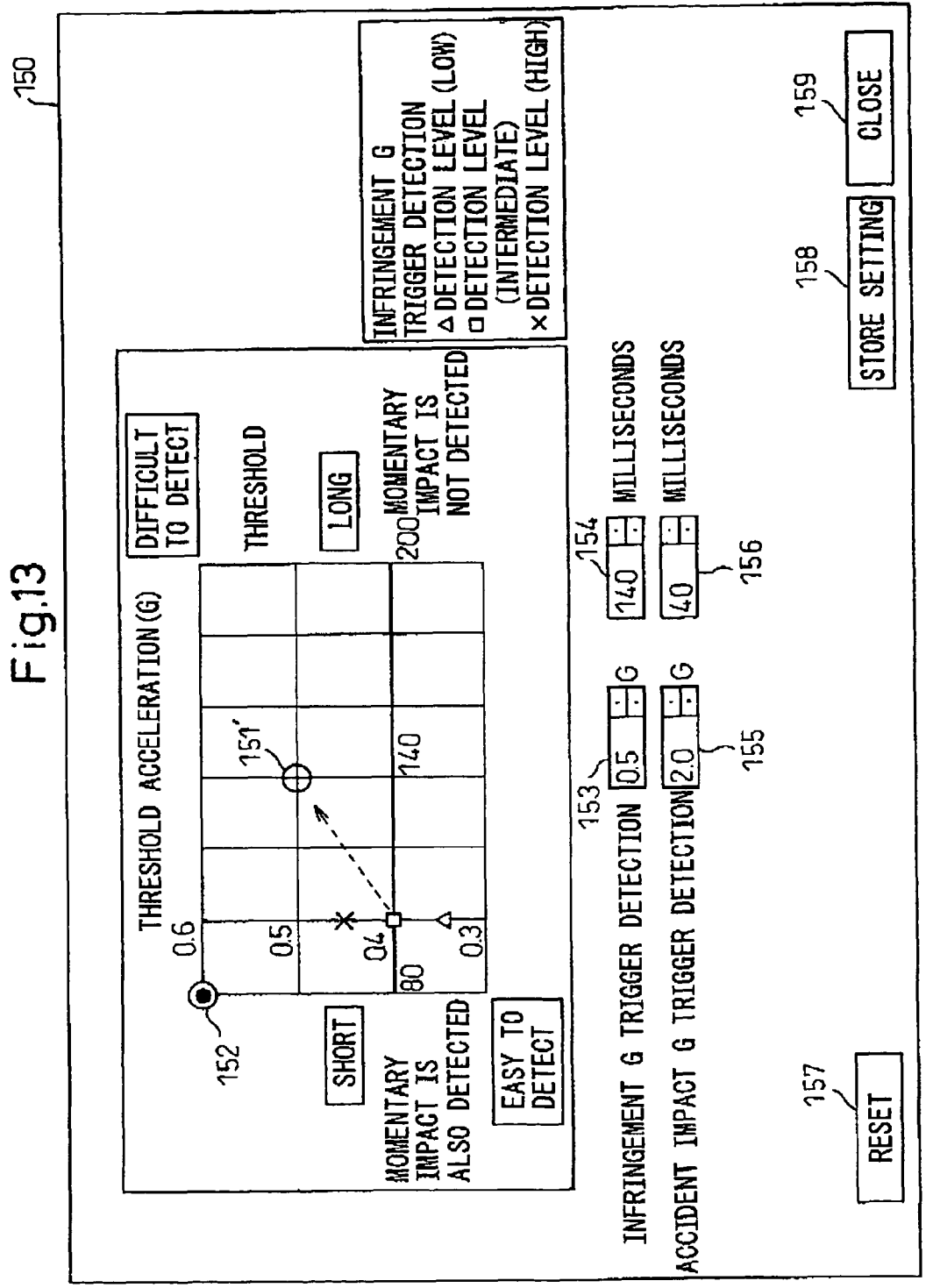
FIG. 13 is a diagram showing a G-detection setting screen example (2).

FIG. 13 is a diagram showing a G-detection setting screen example (2).

A screen 150' shown in FIG. 13 displays a state in which the violation G trigger 151 on the graph is moved to an violation trigger 151' with the mouse. The display content of the display-and-input regions 153 and 154 of the violation G trigger are changed in accordance with the movement to the infringement trigger 151'.

When a "reset" 157 in the screen shown in FIG. 12 and FIG. 13 is selected, all set numerical values are reset. When a "store the setting" 158 is selected, the set recording conditions are stored. When a "close" 159 is selected, the screen is changed over to return to the first screen 100 shown in FIG. 8.

As shown in FIG. 12 and FIG. 13, numerical values can be two-dimensionally and visually determined. Therefore, the setting of the G detection can be easily changed appropriately and in detail.

Figure 14:
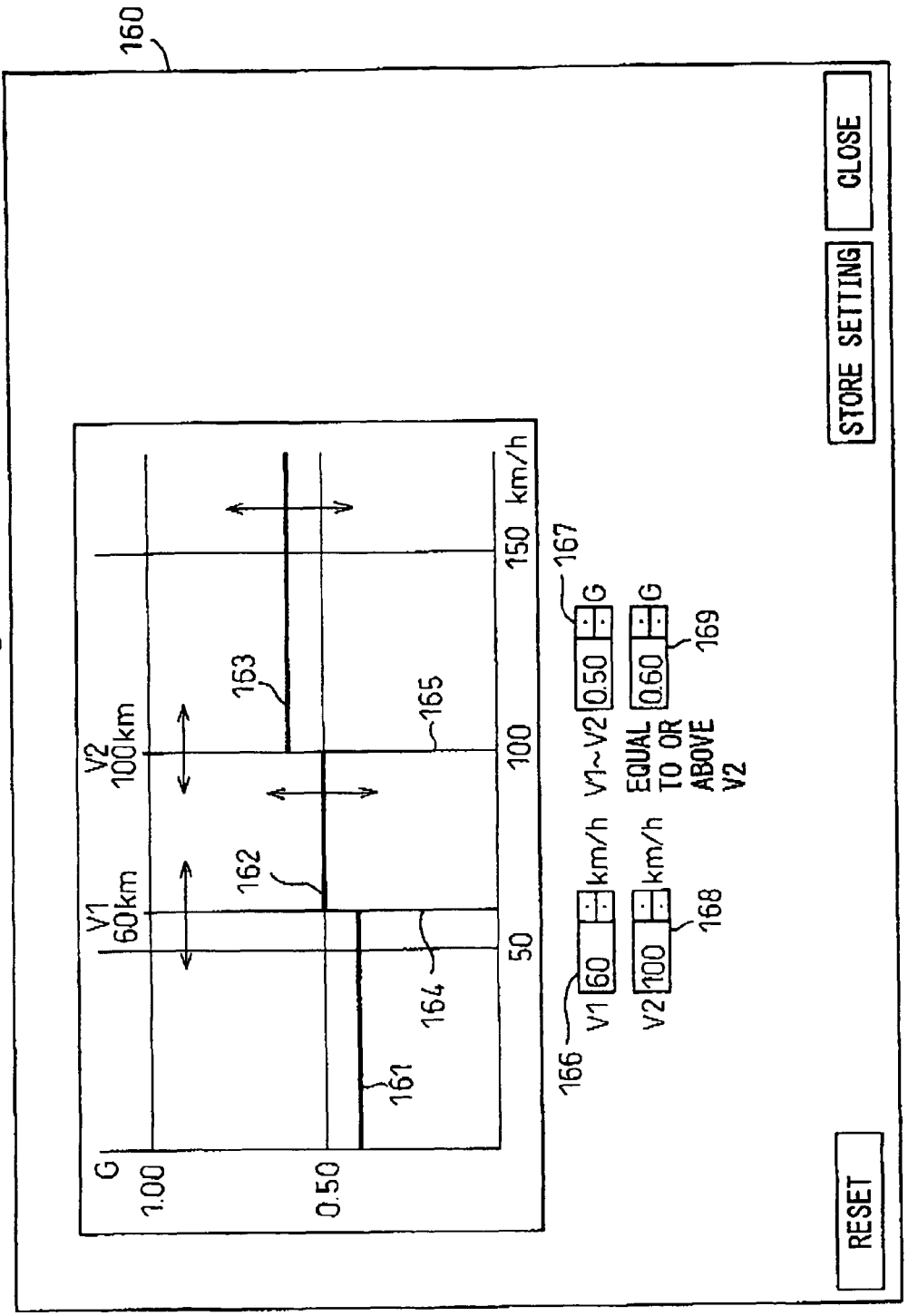
FIG. 14 is a diagram showing a speed-change-condition setting screen example (1).

FIG. 14 is a diagram showing a speed-change-condition setting screen example (1).

When the user selects the "speed change condition" item 112 on the second screen 11, a screen 160 shown in FIG. 14 is displayed in the display unit 440.

The screen 160 displays a graph showing threshold acceleration (0.1 to 1.0 G) in the Y axis, and a vehicle speed (0 to 150 km/h) in the x axis. The graph shows a first infringement G trigger 161 having a vehicle speed up to $V_1$ km/h, a second infringement G trigger 162 having a vehicle speed from $V_1$ to $V_2$ km/h, and a third violation G trigger 163 having a vehicle speed equal to or higher than $V_2$ km/h. The violation G trigger set in the G detection screen 150 shown in FIG. 12 is set as a first violation G trigger 161.

In other words, in the screen 160, the value of the infringement G trigger can be changed according to the change in the vehicle speed. The violation G trigger is set according to the change in the vehicle speed, because when the vehicle speed becomes high, a large G is applied to the vehicle by the brake operation and the steering operation, and this has a risk of establishing the recording condition although the vehicle is not in an accident.

In the screen 160, $V_1$ is set to 60 km/h, and $V_2$ is set to 100 km/h. The second violation G trigger is set to 0.50 G, and the third violation G trigger is set to 0.60 G.

The vehicle speeds $V_1$ and $V_2$, can be changed by moving straight lines 164 and 165 on the graph to the left and right directions with the mouse in the drawing, or by inputting predetermined numerical values into regions 155 and 168. When either one of the two value changes, the display is changed so that the other value also changes following the first change.

The second violation G trigger and the third violation G trigger can be changed by moving straight lines 162 and 163 on the graph to the up and down directions with the mouse in the drawing, or by inputting predetermined values into regions 167 and 169 to change the triggers. When either one of the two value changes, the display is changed so that the other value also changes following the first change. Needless to mention, the first violation G trigger can be also similarly changed in this screen.

Figure 15:
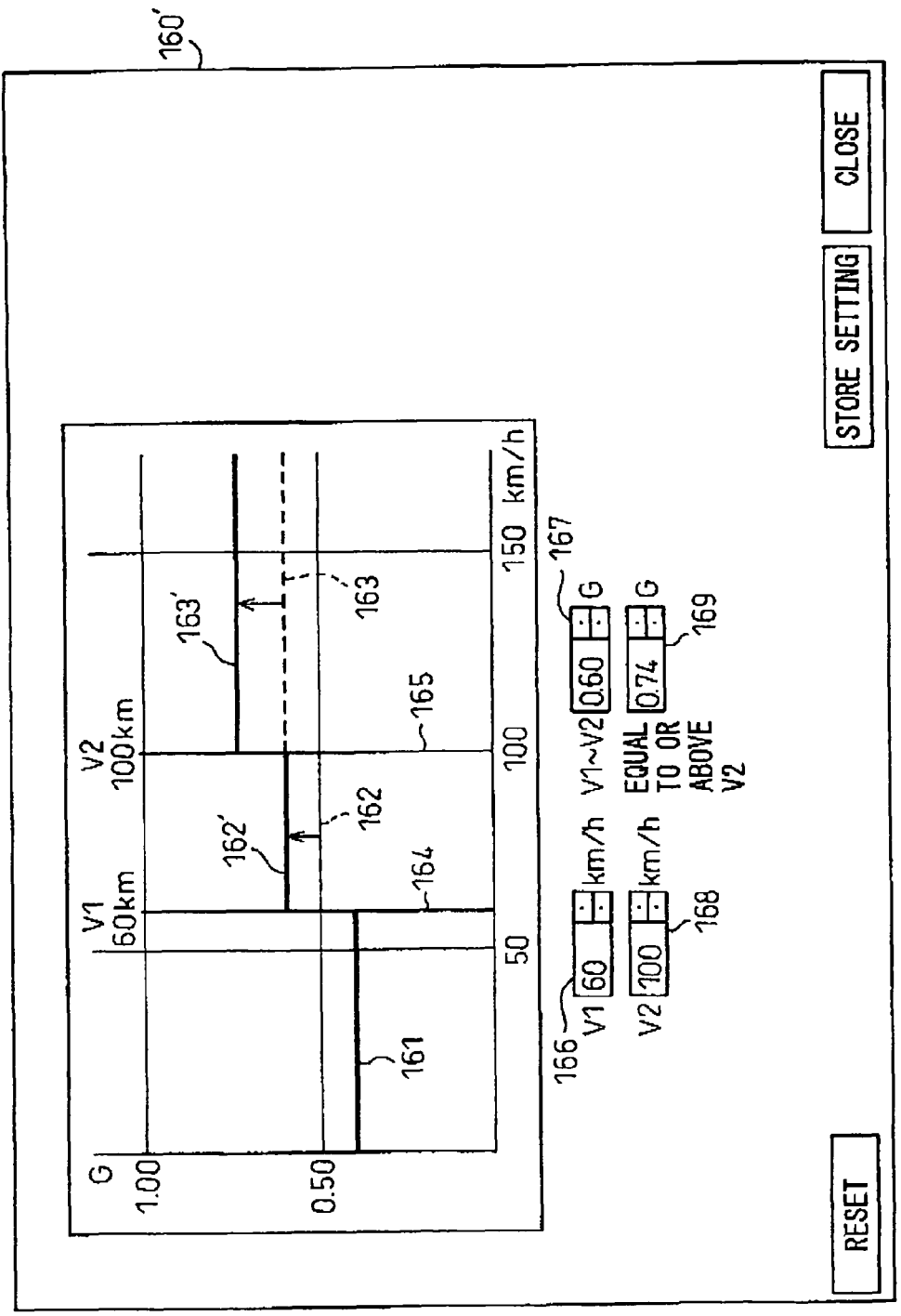
FIG. 15 is a diagram showing a speed-change-condition setting screen example (2).

FIG. 15 is a diagram showing a speed-change-condition setting screen example (2).

A screen 160' shown in FIG. 15 displays a state that the second violation G trigger 162 is moved to a violation trigger 162' with the mouse on the graph, and the third violation G trigger 163 is moved to a violation trigger 163' with the mouse on the graph. Following the move of the violation G triggers, the display contents of the regions 167 and 169 are changed.

The functions of "reset", "store the setting" and "close" on the screens in FIG. 14 and FIG. 15 are similar to those in FIG. 12, and therefore, their explanation is omitted.

As shown in FIG. 14 and FIG. 15, numerical values can be visually changed at stages. Therefore, a detailed setting of the G detection can be changed easily and appropriately.

Figure 16:
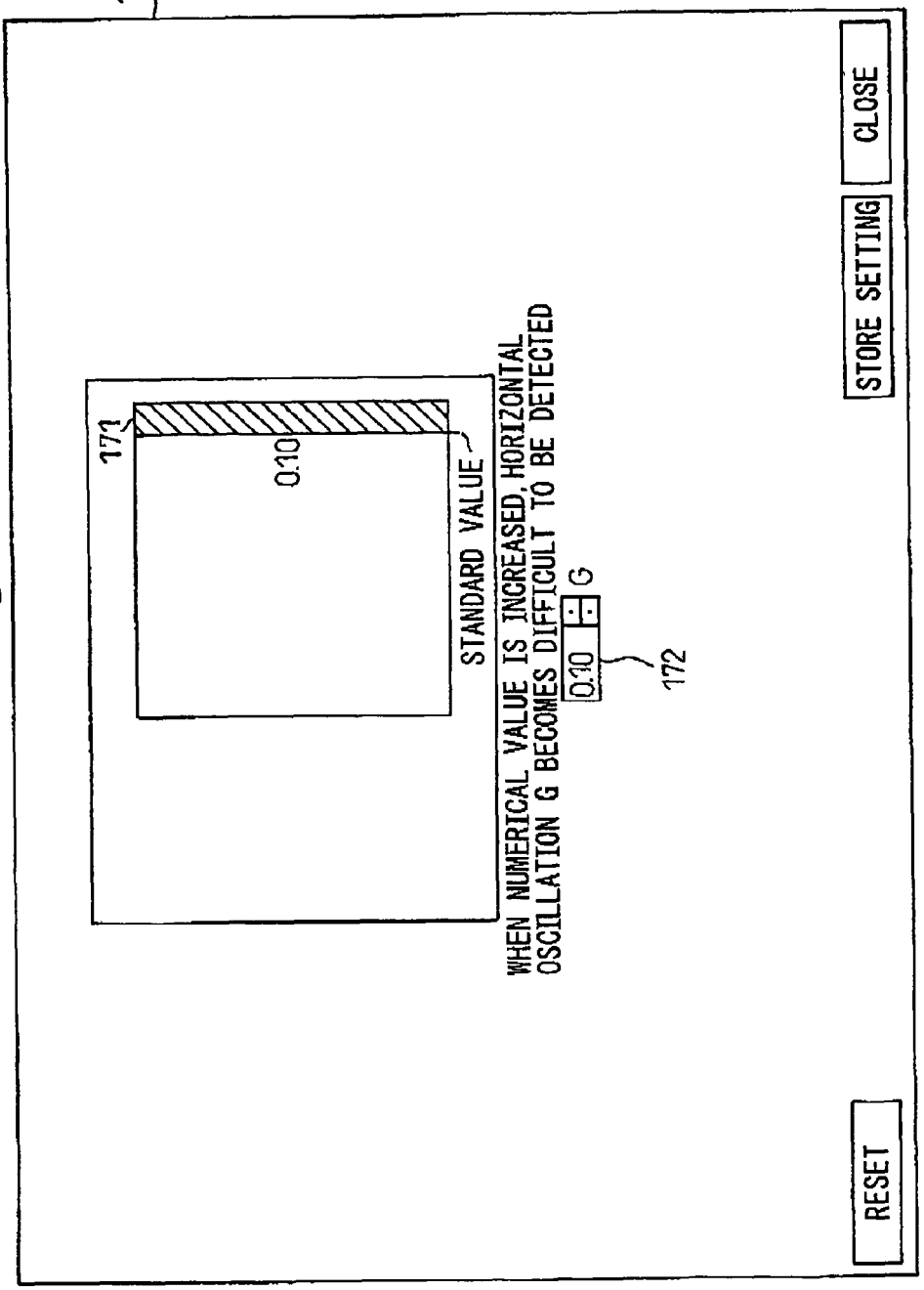
FIG. 16 is a diagram showing a horizontal-oscillation-correction setting screen example (1).

FIG. 16 is a diagram showing a horizontal-oscillation-correction setting screen example (1).

When the user selects the "horizontal-oscillation correction" item 113 in the second screen 110, a screen 170 shown in FIG. 16 is displayed on the display unit 440.

The screen 170 displays a horizontal-oscillation detection level 171, and a display-and-input region 172 of a horizontal-oscillation detection level. A standard value of the horizontal-oscillation detection level is set to 0.10 G. The acceleration sensor 5 detects Gy as the gravity acceleration in the front and back directions of the vehicle 1, and Gx as the gravity acceleration in the left and right directions of the vehicle 1, as described above. However, because Gx is sensed low, the recording condition of the detection G is established in some case, while the driver does not sense that actually large acceleration is applied to the vehicle, despite a large Gx.

Therefore, the actual detection result is subtracted by a predetermined numerical value in advance, and the sense is coincided with the recording condition. Specifically, after the measured value Gx is subtracted by a numerical value set in the screen 170, the combined gravity acceleration is calculated. For example, in the screen 170, because the value is set to 0.10 G, Gx is converted to (Gx-0.01), and the process is performed thereafter.

A horizontal-oscillation sensitivity level can be changed by moving the horizontal-oscillation detection level 171 on the graph to the left and right directions with the mouse in the drawing, or by inputting a predetermined numerical value into the region 172. When either one of the two value changes, the display is changed so that the other value also changes following the first change.

Figure 17:
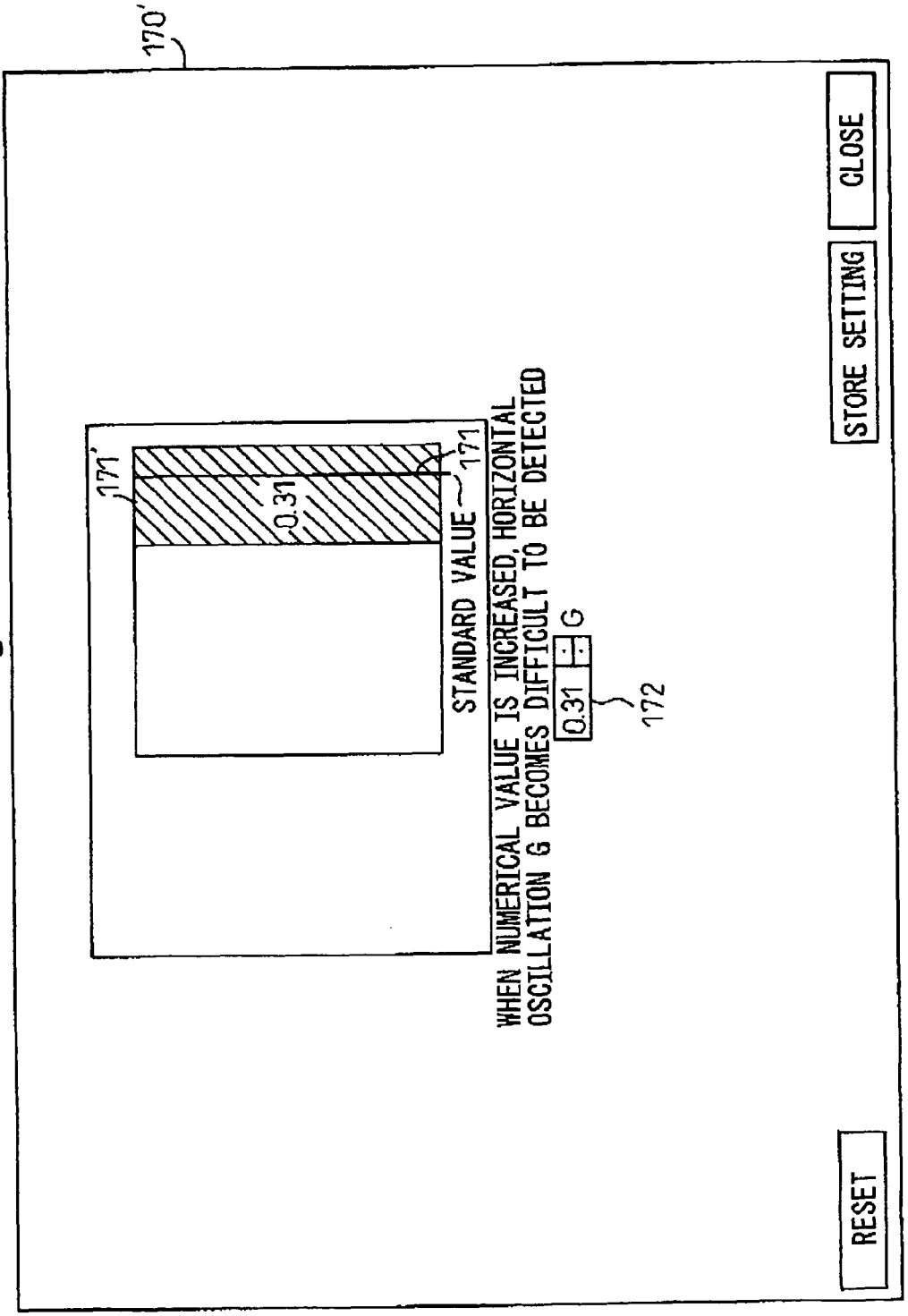
FIG. 17 is a diagram showing a horizontal-oscillation-correction setting screen example (2).

FIG. 17 is a diagram showing a horizontal-oscillation-correction setting screen example (2).

A screen 170' shown in FIG. 17 displays a state that the horizontal-oscillation detection level 171 is moved to a horizontal-oscillation detection level 171' with the mouse on the graph. Following the move of the horizontal-oscillation detection level, the display content of the region 172 is changed.

The functions of "reset", "store the setting" and "close" on the screens in FIG. 16 and FIG. 17 are similar to those in FIG. 12, and therefore, their explanation is omitted.

As shown in FIG. 16 and FIG. 17, numerical values can be visually changed. Therefore, a detailed setting of the G detection can be changed easily and properly.

Figure 18:
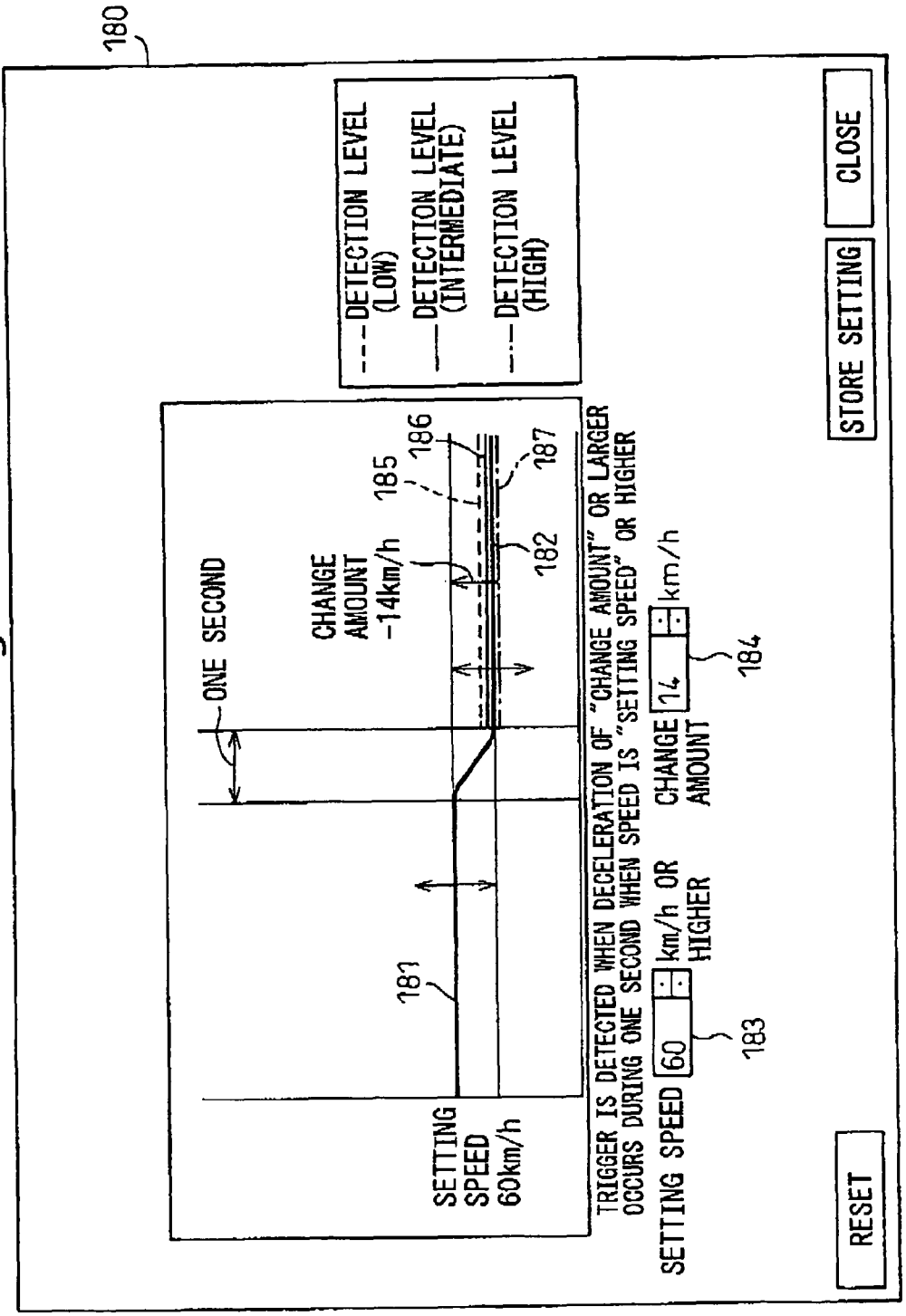
FIG. 18 is a diagram showing a speed-change-trigger setting screen example (1).

FIG. 18 is a diagram showing a speed-change-trigger setting screen example (1).

When the user selects the "speed change trigger" item 114 in the second screen 110, a screen 180 shown in FIG. 18 is displayed in the display unit 440.

The screen 180 displays a graph showing a vehicle speed (0 to 100 km/h) in the Y axis and a time lapse in the X axis. The graph shows a set speed 181 and a change amount 182. The screen 180 also displays a display-and-input region 183 of a set speed, and a display-and-input region 184 of a change amount.

In other words, the screen 180 displays a setting of a speed-change trigger that a vehicle speed change of −14 km/h or more occurs within one second when the set speed is equal to or higher than 60 km/h. When this speed change occurs, it can be determined that there is a high possibility that an accident may occur.

The set speed and the change amount can be changed by moving straight lines 181 and 182 on the graph to the up and down directions with the mouse, or by inputting predetermined numerical values into the display-and-input regions 183 184. When either one of the two value changes, the display is changed so that the other value also changes following the first change.

The graph displays an indicator 185 of a low detection level, an indicator 186 of an intermediate detection level, and an indicator 187 of a high detection level, thereby providing the user with indications of changing the setting.

Figure 19:
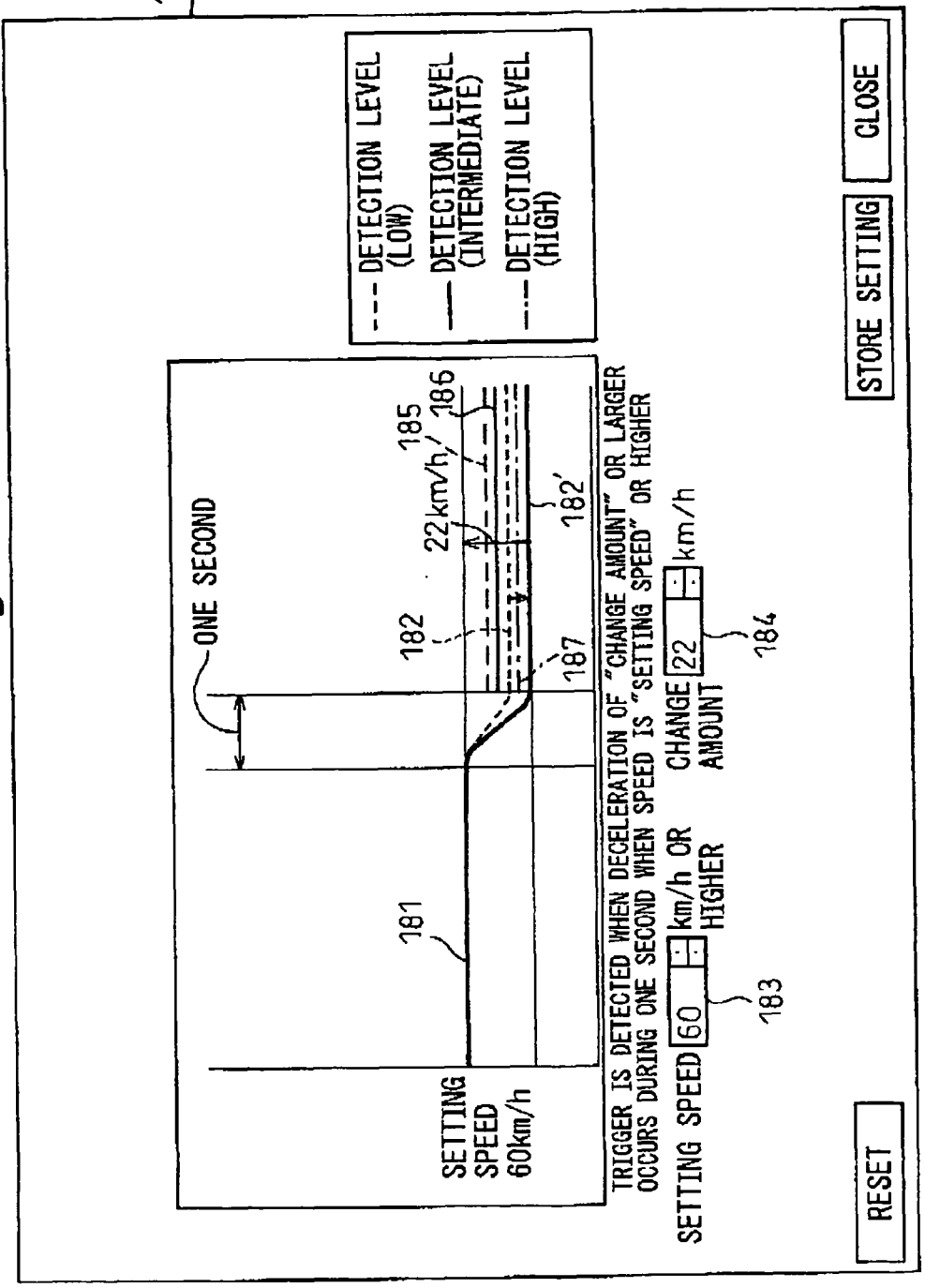
FIG. 19 is a diagram showing a speed-change-trigger setting screen example (2).

FIG. 19 is a diagram showing a speed-change-trigger setting screen example (2).

A screen 180' shown in FIG. 19 displays a state that the change amount 182 is moved to a change amount 182' with the mouse on the graph. Following the move of the change amount 12, the display content of the display-and-input region 184 is changed.

The functions of "reset", "store the setting" and "close" on the screens in FIG. 18 and FIG. 19 are similar to those in FIG. 12, and therefore, their explanation is omitted.

As shown in FIG. 18 and FIG. 19, numerical values can be visually changed at stages. Therefore, a detailed setting of the speed change trigger can be changed easily and properly.

As explained above with reference to FIG. 12 to FIG. 19, when it is determined that the recording condition is inappropriate after confirming the image information, the setting of the recording condition, including the above-described G detection the seed change trigger, can be easily and properly changed.

In the above embodiment, the mode of displaying the reproduced image and the recording condition shown at step S4 in FIG. 10 and FIG. 11 is combined with the mode of changing the setting of the recording condition shown at steps S5 to S8 in FIG. 12 to FIG. 19 and FIG. 11 on the graph. However, in the present invention, each mode is independent.

User ranking and vehicle trace using the operating information will be explained below.

The user ranking is ranking of various users' operation states, based on the following six violation codes, from event data or operating information that the users record into the memory card 6. The vehicle trace is a time series display of a moving state of a user on the map, from the operating information that the user records into the memory card 6.

The six violation codes for determining the user operation state are shown below.

1. Speed Excess:

A driver drives a vehicle at a speed higher than a predetermined speed (for example, 80 km/h) for a predetermined time (ten seconds, for example) or more. The speed excess is recorded into the memory card 6 as event data "speed excess", when the drive recorder 2 detects that the speed excess condition set as one of dangerous-driving conditions is established. Therefore, the speed excess is determined based on the event data read from the memory card 6.

2. Rapid Acceleration:

A running speed increases by a predetermined increase value (13 km/h, for example) or more during a predetermined time (one second, for example). The rapid acceleration is recorded into the memory card 6 as event data "rapid acceleration", when the drive recorder 2 detects that the rapid acceleration condition set as one of dangerous-driving conditions is established. Therefore, the rapid acceleration is determined based on the event data read from the memory card 6.

3. Rapid Deceleration:

A running speed decreases by a predetermined reduction value (13 km/h, for example) or more during a predetermined time (one second, for example). The rapid deceleration is recorded into the memory card 6 as event data "rapid deceleration", when the drive recorder 2 detects that the rapid deceleration condition set as one of dangerous-driving conditions is established. Therefore, the rapid deceleration is determined based on the event data read from the memory card 6.

4. Sharp Turn:

The gravity acceleration Gx in the left and right directions of the vehicle 1 becomes equal to or higher than a predetermined detected value (0.45 G, for example) during a predetermined time (500 milliseconds, for example). The sharp turn is recorded into the memory card 6 as event data "sharp turn", when the drive recorder 2 detects that the sharp turn condition set as one of dangerous-driving conditions is established. Therefore, the sharp turn is determined based on the event data read from the memory card 6.

5. Idling:

The vehicle continues a state of the ACC switch ON and the speed 0 km/h during a predetermined time (five minutes, for example) or more. The idling is determined based on the output of the ACC switch 19 and the speed information detected from the vehicle speed sensor 10.

6. Long-Time Driving:

The output of the ACC switch 19 does not become OFF during a predetermined time (two hours, for example) or more. The drive recorder 2 determines the long-time driving based on the output of the ACC switch 19, out of the operating information recorded at every one second. The speed excess, the rapid acceleration, the rapid deceleration, and the sharp turn can be also determined based on the operating information recorded at every one second.

The states corresponding to the above six violation codes are dangerous driving states (the above violation codes 1 to 4), and behaviors that become elements of aggravating the environment (the above violation codes 5 and 6). Therefore, whether or not the events corresponding to the above six violation codes occur while the user is using (driving) the vehicle is determined. When the events corresponding to the violation codes occur, points corresponding to each code are subtracted from 100 full marks. The display device 440 of the playback device 400 displays the user ranking. The CPU 424 performs the display of the user ranking based on the data recorded in the card-information recording unit 460, based on the control program 417. When the ranking operation is performed, all of the above six codes are not required, and several codes can be selected among the six codes according to needs.

Figure 20:
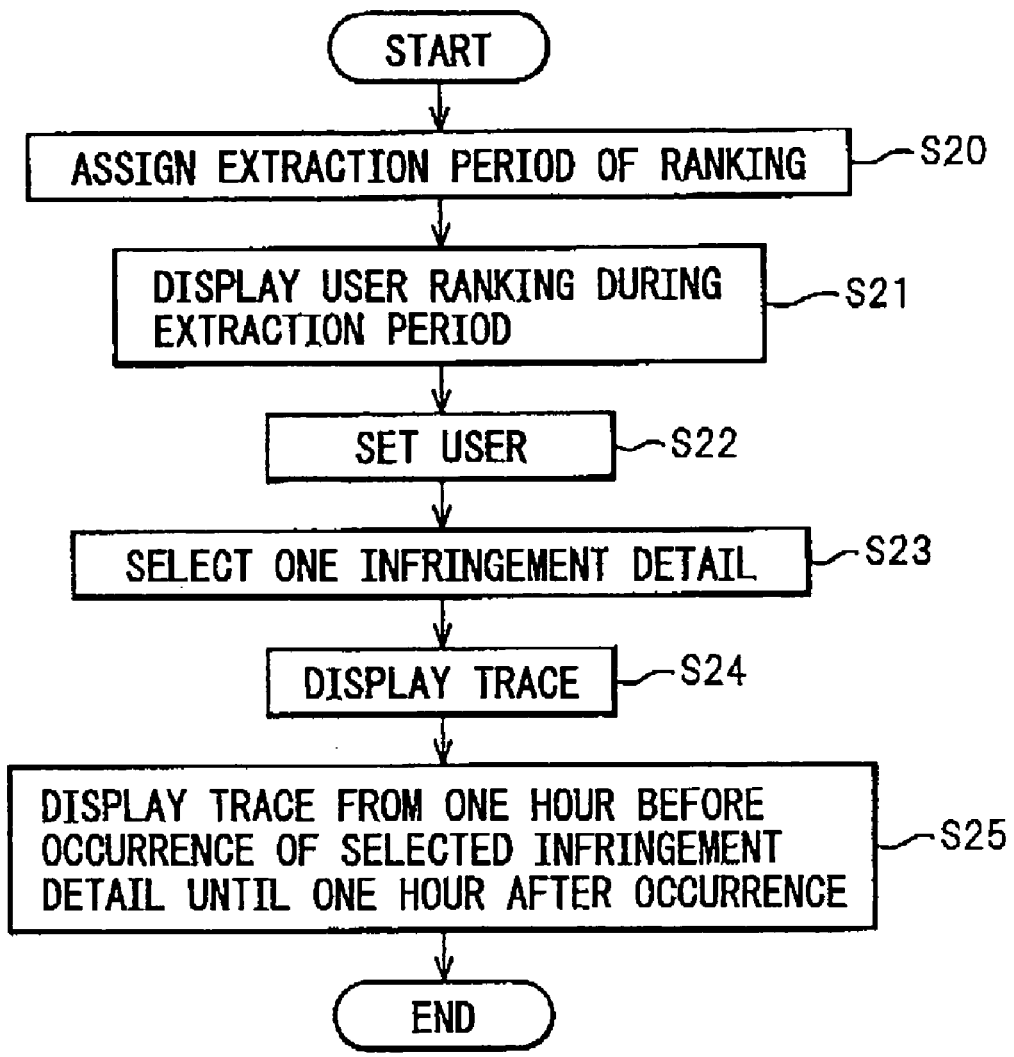
FIG. 20 is a diagram showing a flow from a user ranking to a vehicle trace.

FIG. 20 is a diagram showing a flow from the user ranking to the vehicle trace.

The CPU 24 performs the operation of the flow shown in FIG. 20, cooperating with each element of the playback device 400, based on the control program 417. When the flow shown in FIG. 20 is started, the power source of the playback device 400 is turned ON, and each element becomes in an operable state. The card-information memory unit 460 is already recorded with the information of the memory card 6 operated by plural users.

First, the user operates the operation unit 430 to select the "economic safe driving analysis" item 105 in the first screen 100, thereby displaying the third screen 120. Further, the user selects the "ranking" item 121 to make the ranking display screen 200 shown in FIG. 21 displayed in the display unit 440.

Next, the user performs both or either one of a selection of a period assignment item 201 in a screen 200 and an input of a suitable numerical value into a date item 202, and selects a "search" item 203 (S20).

Then, a ranking display column 212 in a screen 210 in FIG. 22 sequentially displays users stored in the data, in the high order of comprehensive evaluation during a period assigned at S20 (S21). The comprehensive evaluation is determined based on the operating information containing the event information of each user, by judging whether or not each user performs the operation corresponding to the "speed excess", the "rapid acceleration", the "rapid deceleration", the "sharp turn", the "idling", and the "long-time driving". The ranking display column 212 displays comprehensive evaluation, rank, number of times of violation, running distance, working time, maximum speed (general road), maximum speed (highway), average speed, total running distance, total working time, and operation tendency.

Next, a specific user, for example, a user A (212), is selected from the users displayed in the ranking display column 212 (S22).

Figure 23:
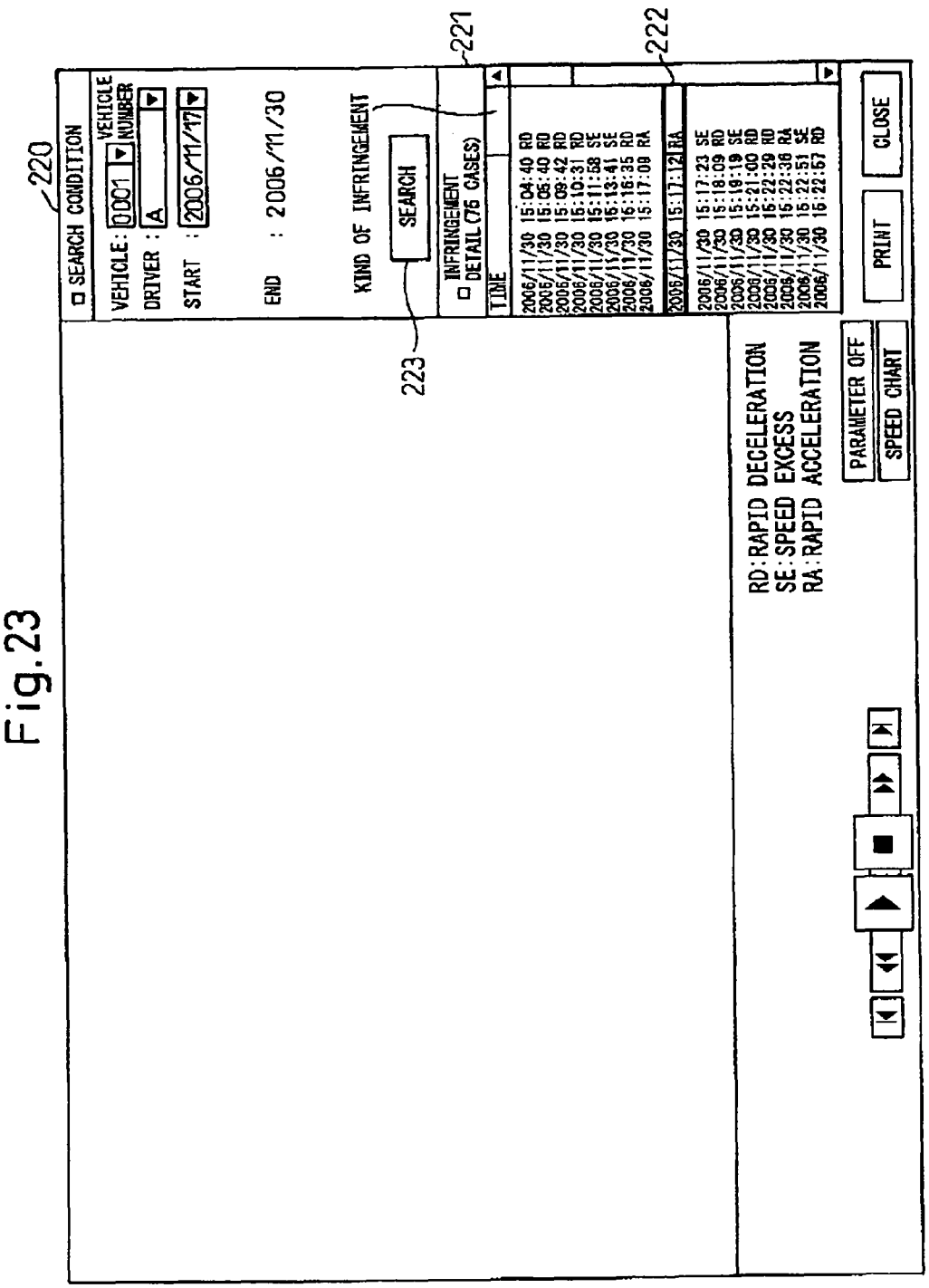
FIG. 23 is a diagram showing a violation-detail screen example.

Then, an violation-detail display column 221 in a screen 220 shown in FIG. 23 displays violation details that the user selected at S22 perform during the period specified at S21 (S23). The violation corresponding to any one of the six evaluation items, and a date of the violation and a kind of violation that is, one of the six evaluation items) are displayed.

When the user selects a predetermined violation, for example, an violation 222, in the violation-detail display column 221 (S24), a trace display column 231 in a screen 230 shown in FIG. 24 displays a trace display of a vehicle from one hour before the occurrence of a selected violation until one hour after the occurrence of the violation (S25).

The vehicle trace screen 230 shown in FIG. 24 displays a column 232 showing marks of violation codes (speed excess, rapid acceleration, rapid deceleration, sharp turn, and idling) and recording conditions (G detection, speed trigger, operation SW), a control button 233 to perform a move, a rewinding, a fast forwarding, and a temporary stop in time series of the vehicle trace, a "parameter OFF" item 234, a "speed chart" display item 235, a "print" item 236, and a "close" item 237.

The trace display column 231 displays a vehicle moving route 240, vehicle position plots 241 to 246, and violation code marks 247 to 249. The vehicle position plots 241 to 246 contain information of proceeding-direction arrowhead, vehicle presence-time (hour, minute, second), and vehicle speed. The vehicle position plot is displayed on a map extracted from the map-information recording unit 450, based on the vehicle-position information detected from the GPS receiving device 9 contained in the operating information. The proceeding-direction arrowhead is obtained from a relationship between the vehicle position information contained in the previous vehicle position plot and the vehicle position information contained in the present vehicle position plot. Therefore, the vehicle moving route 240 is displayed to connect between the vehicle position plots.

The trace display column 231 in FIG. 24 shows as the vehicle position plot 246, the violation 222 (rapid acceleration at 15 hours 17 minutes 12 seconds) selected in the violation-detail display column 221 shown in FIG. 23. The trace display column 231 also shows the mark 249 indicating the rapid acceleration. As explained above, the vehicle position plots where the violation codes (speed excess, rapid acceleration, rapid deceleration, sharp turn, and idling) and the recording conditions (G detection, speed trigger, operation SW) shown in the column 232 occur are always displayed with the corresponding marks. Because the marks expressing vehicle position plots, violation codes, and recording conditions are displayed together in this way, a point on the route and a running state of the vehicle can be easily and simply understood.

While the trace display column 231 displays only five points before the occurrence of the violation 222, for convenience sake, the trace display column 231 can actually display vehicle position plots one hour before and after the occurrence of the violation 222. The above period (one hour before and after the occurrence of the violation) of the vehicle position plots displayed based on the selected violation is one example, and other value can be also selected.

In FIG. 24, when the "speed chart" item 235 is selected, a vehicle speed chart displayed in the trance display column 231 can be displayed.

FIG. 25 is a diagram showing a speed-chart screen example.

A screen 250 displays operation day data 251, user data 252, a first-speed-chart display column 253, a second-speed-chart display column 254, and a "close" item 255. The first-speed-chart display column 253 expresses a vehicle speed in the vertical axis and time in the lateral axis, and has a vehicle speed at each time plotted based on the speed information detected from the vehicle speed sensor 10 contained in the operating information. The second-speed-chart display column 254 expresses distance (5 km) in the vertical axis and time in the lateral axis, and displays a vehicle running distance per each time, i.e., in the second-speed-chart display column 254, when a vertical line is short, a running distance per unit time is large. While the screen 250 shows a speed chart for eight hours from PM14 to PM22, this chart is one example, and the chart is not limited to the eight-hour display.

As explained above with reference to FIG. 20 to FIG. 25, the running state of the user of the memory card 6 can be accepted easily, based on the user ranking, the vehicle trace, and the speed chart using the operating information.

Conditions of the violation codes, that is, the change of the setting of the dangerous-driving conditions will be explained below.

According to the embodiment of the present invention, condition settings of the six violation codes used to perform the ranking can be changed. In the third screen 120 shown in FIG. 8, when a "setting change of determination level" item 122 is selected, the fourth screen 130 is displayed. By selecting each item, four violation codes out of the six codes can be easily changed. For the other two violation codes, the setting can be similarly changed.

FIG. 26 is a diagram showing a speed-excess-setting screen example (1).

When the user selects a "speed excess" item 131 in the fourth screen 130, a screen 260 shown in FIG. 26 is displayed in the display unit 440.

The screen 260 displays a graph having a vehicle speed (0 to 200 km/h) expressed in the Y axis, and having a time lapse expressed in the X axis. The graph shows a limit speed 262 on the highway, a limit speed 263 on the general road, and a detection time interval 261. The screen 260 shows a display-and-input region 264 of a limit speed on the highway, a display-and-input region 265 of a limit speed on the general road, and a display-and-input region 266 of detection time. When a "reset" item 267 shown on the screen 260 is selected, all the set numerical values are reset. When a "store setting" item 268 is selected, a determination standard of the violation code is stored. When a "close" item 269 is selected, the screen is changed over to return to the third screen 120 shown in FIG. 8.

In the screen 260, when a driver drives the vehicle at or above 100 km/h on the highway for ten or more seconds, or when the driver drives the vehicle at or above 80 km/h on the general road for ten or more seconds, this is determined to correspond to the violation code of speed excess.

FIG. 27 is a diagram showing a speed-excess-setting screen example (2).

A screen 260' shown in FIG. 27 displays a state that a detection time 261 is moved to a detection time 261' with the mouse on the graph, a limit speed 262 on the highway is moved to a limit speed 262' on the highway by the mouse, and a limit speed 263 on the general road is moved to a limit speed 263' on the general road by the mouse. Following the move of the detection time 261, the move of the limit speed 262 on the highway, and the move of the limit speed 263 on the general road, the display contents in display-and-input regions 264, 265, and 266 are changed.

As shown in FIG. 26 and FIG. 27, numerical values can be visually changed at stages. Therefore, the setting conditions of the speed excess can be changed easily and properly.

FIG. 28 is a diagram showing a rapid-acceleration-setting screen example (1).

When the user selects a "rapid acceleration" item 132 in the fourth screen 130, a screen 270 shown in FIG. 28 is displayed on the display unit 440.

The screen 270 displays a graph showing a vehicle speed (0 to 100 km/h) in the Y axis and a time lapse in the X axis. The graph displays a detection time 271, and a speed increase value 272 of the rapid acceleration. When a speed increase equal to or higher than 13 km/h occurs during 1.0 second, it is determined that this corresponds to the violation code of rapid acceleration. The screen 270 displays a display-and-input region 275 of the detection time, and a display-and-input region 276 of a speed increase value.

The graph also displays an indicator 273 of a low determination level, and an indicator 274 of a high determination level, thereby providing the user with indications of changing the setting. The screen 270 displays that the rapid acceleration is set to the intermediate determination level.

FIG. 29 is a diagram showing a rapid-acceleration-setting screen example (2).

A screen 270' shown in FIG. 29 displays a state that the speed increase value 272 is changed to a speed increase value 272' with the mouse on the graph. Following the moves of the detection time 271 and the speed increase value 272, the display contents of display-and-input regions 275 and 276 are changed.

The functions of "reset", "store the setting" and "close" on the screens in FIG. 2B and FIG. 29 are similar to those in FIG. 26, and therefore, their explanation is omitted.

As shown in FIG. 28 and FIG. 29, numerical values can be visually changed at stages. Therefore, the setting conditions of the rapid acceleration can be changed easily and properly.

FIG. 30 is a diagram showing a rapid-deceleration-setting screen example (1).

When the user selects a "rapid deceleration" item 133 in the fourth screen 130, a screen 280 shown in FIG. 30 is displayed on the display unit 440.

The screen 280 displays a graph showing a vehicle speed (0 to 100 km/h) in the Y axis and a time lapse in the X axis. The graph displays a detection time 281, and a speed reduction value 282 of the rapid deceleration. When a speed reduction equal to or more than 13 km/h occurs during 1.0 second, it is determined that this corresponds to the violation code of rapid deceleration. The screen 280 displays a display-and-input region 285 of the detection time, and a display-and-input region 286 of a speed reduction value.

The graph also displays an indicator 283 of a low determination level, and an indicator 284 of a high determination level, thereby providing the user with indications of changing the setting. The screen 280 displays that the rapid deceleration is set to the intermediate determination level.

FIG. 31 is a diagram showing a rapid-deceleration-setting screen example (2).

A screen 280' shown in FIG. 31 displays a state that the detection time 281 is changed to a detection time 2811 with the mouse on the graph and the speed reduction value 282 is moved to a speed reduction value 282' with the mouse. Following the moves of the detection time 281 and the speed reduction value 282, the display contents of display-and-input regions 285 and 286 are changed.

The functions of "reset", "store the setting" and "close" on the screens in FIG. 30 and FIG. 31 are similar to those in FIG. 26, and therefore, an explanation is omitted.

As shown in FIG. 30 and FIG. 31, numerical values can be visually changed at stages. Therefore, the setting conditions of the rapid deceleration can be changed easily and properly.

FIG. 32 is a diagram showing a sharp-turn-setting screen example (1).

When the user selects a "sharp turn" item 134 in the fourth screen 130, a screen 290 shown in FIG. 30 is displayed in the display unit 440.

The screen 290 displays a graph showing acceleration (0 to 2.0 G) in the Y axis and a time lapse in the X axis. The graph displays a detection time 291, and gravity acceleration Gx 292 in the left and right directions of the vehicle of a sharp turn. When Gx equal to or higher than 0.45 G is detected during 500 milliseconds, it is determined that this corresponds to the violation code of sharp turn. The screen 290 displays a display-and-input region 295 of the detection time, and a display-and-input region 296 of gravity acceleration in the left and right directions of the vehicle.

The graph also displays an indicator 293 of a low determination level, and an indicator 294 of a high determination level, thereby providing the user with indications of changing the setting. The screen 290 displays that the sharp turn is set to the intermediate determination level.

FIG. 33 is a diagram showing a sharp-turn-setting screen example (2).

A screen 290' shown in FIG. 33 displays a state that the detection time 291 is changed to a detection time 2911 by the mouse on the graph and the gravity acceleration Gx 292 in the left and right directions of the vehicle is moved to gravity acceleration Gx 292' in the left and right directions of the vehicle by the mouse. Following the moves of the detection time 291 and the gravity acceleration Gx 292 in the left and right directions of the vehicle, the display contents of display-and-input regions 295 and 296 are changed.

The functions of "reset", "store the setting" and "close" on the screens in FIG. 32 and FIG. 33 are similar to those in FIG. 26, and therefore, their explanation is omitted.

As shown in FIG. 32 and FIG. 33, numerical values can be visually changed at stages. Therefore, the setting conditions of the sharp turn can be changed easily and properly.

As explained above with reference to FIG. 26 to FIG. 33, setting of the conditions of the infringement items at the time of performing ranking can be changed easily and securely.

What is claimed is:

1. A vehicle-running-state display method, comprising the steps of:
    obtaining a speed excess state in which the speed of the vehicle exceeds a set speed during at least a predetermined time, a rapid acceleration state in which the speed of the vehicle increases by at least a predetermined speed during a predetermined time, and a rapid deceleration state in which the speed of the vehicle decreases by at least a predetermined speed during a predetermined time, based on position information, time information, or speed information of the vehicle, by a processor;
    displaying a track of the vehicle into a map screen of a display, based on the position information and the time information, by the processor; and
    displaying the detected speed excess state, rapid acceleration state, or rapid deceleration state, on the map screen on which the track is displayed, by the processor.

2. The vehicle-running-state display method according to claim 1, further comprising the step of changing a set condition of obtaining the speed excess state, the rapid acceleration state, or the rapid deceleration state.

3. A vehicle-running-state display method comprising the steps of:
    storing operating information and an image at every first predetermined time, and recording the operating information and the image stored for a predetermined period into a nonvolatile recording unit when a recording condition is established, by the processor;
    recording position information and time information of the vehicle at every second predetermined period longer than the first predetermined time, into the nonvolatile recording unit, by the processor;
    obtaining a speed excess state in which the speed of the vehicle exceeds a set speed during at least a predetermined time, a rapid acceleration state in which the speed of the vehicle increases by at least a predetermined speed during a predetermined time, a rapid deceleration state in which the speed of the vehicle decreases by at least a predetermined speed during a predetermined time, an idling state in which there is no movement of the vehicle during at least a predetermined time, and a long-time driving state in which the movement of the vehicle continues during at least a predetermined time, based on the operating information, by the processor;
    displaying a track of the vehicle on the map screen of a display, based on the position information and the time information at each second predetermined period, by the processor; and
    displaying the speed excess state, the rapid acceleration state, the rapid deceleration state, the idling state, or the long-time driving state on the map screen on which the track is displayed, by the processor.

4. The vehicle-running-state display method according to claim 3, further comprising the step of changing a setting condition of obtaining the speed excess state, the rapid acceleration state, the rapid deceleration state, the idling state, or the long-time driving state.

* * * * *